(12) United States Patent
Huang

(10) Patent No.: US 12,422,727 B1
(45) Date of Patent: Sep. 23, 2025

(54) WEDGE-SHAPED LIQUID CRYSTAL CELL ARRAY CAPABLE OF CONTROLLING LIGHT ANGLE DEFLECTION

(71) Applicant: Shi-Hwa Huang, New Taipei (TW)

(72) Inventor: Shi-Hwa Huang, New Taipei (TW)

( * ) Notice: Subject to any disclaimer, the term of this patent is extended or adjusted under 35 U.S.C. 154(b) by 0 days.

(21) Appl. No.: 18/822,008

(22) Filed: Aug. 30, 2024

(51) Int. Cl.
  *G02F 1/31* (2006.01)
  *G02F 1/1333* (2006.01)
(52) U.S. Cl.
  CPC .......... *G02F 1/31* (2013.01); *G02F 1/133371* (2013.01); *G02F 2201/34* (2013.01)
(58) Field of Classification Search
  CPC .............................. G02F 1/133371; G02F 1/31
  See application file for complete search history.

(56) References Cited

U.S. PATENT DOCUMENTS 8,184,280 B2 * 5/2012 Meijer ...................... G01J 3/36
  356/217

FOREIGN PATENT DOCUMENTS

JP         2900575 B2 *  6/1999
WO   WO-2021184925 A1 *  9/2021

* cited by examiner

*Primary Examiner* — Mariceli Santiago
(74) *Attorney, Agent, or Firm* — Ying-Ting Chen; Law Office of Michael Chen

(57) ABSTRACT

A wedge-shaped liquid crystal cell array capable of controlling light angle deflection, using electro-optical effect of liquid crystal and a wedge-shaped angle liquid crystal layer, angle of reflected light, switching and shifting of transmitted light can be controlled, the liquid crystal cell comprises: a wedge-shaped upper cover glass, the cover glass is formed with an extended slope and an included angle, first transparent conductive films are attached to the slope, a first alignment film is attached to another side of the first conductive film; a liquid crystal layer, an upper side of the layer is attached to the first alignment film of the cover glass; and a base glass, at least one second transparent conductive film is attached to the base glass, a second alignment film is attached to another side of the second conductive film, and another side of the second alignment film is attached to the layer.

19 Claims, 28 Drawing Sheets

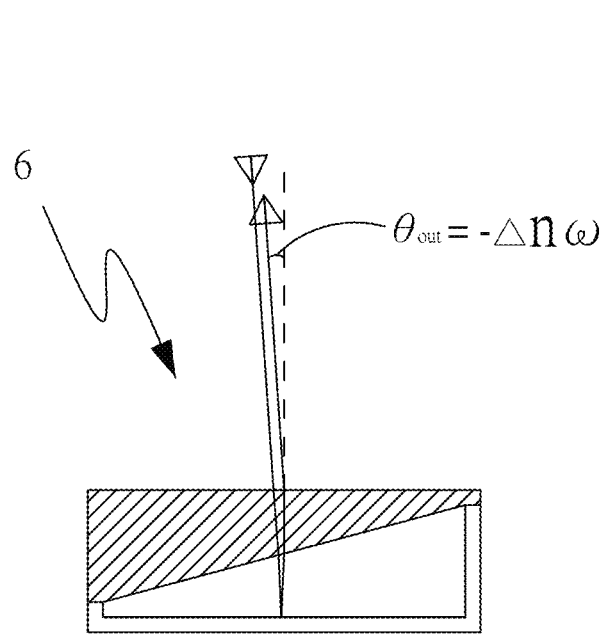
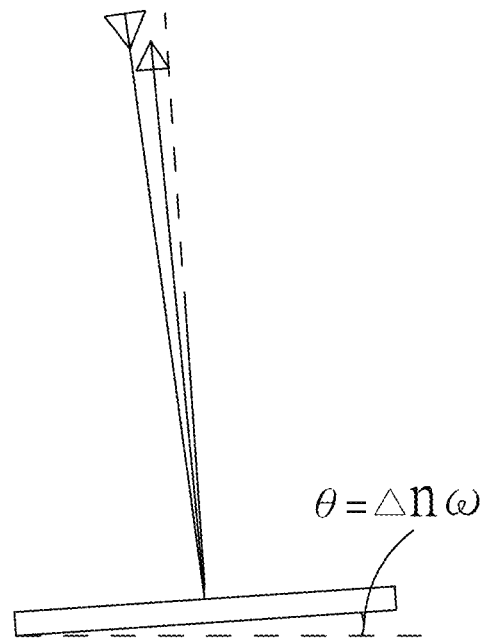
FIG. 6C
FIG. 6D
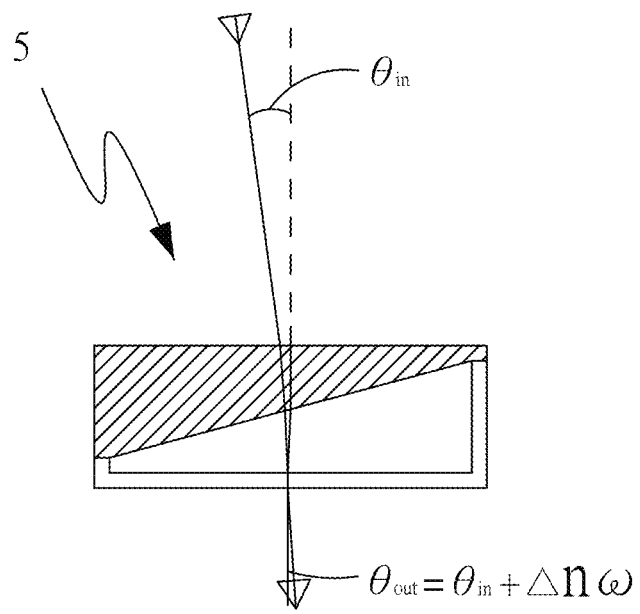
FIG. 6E

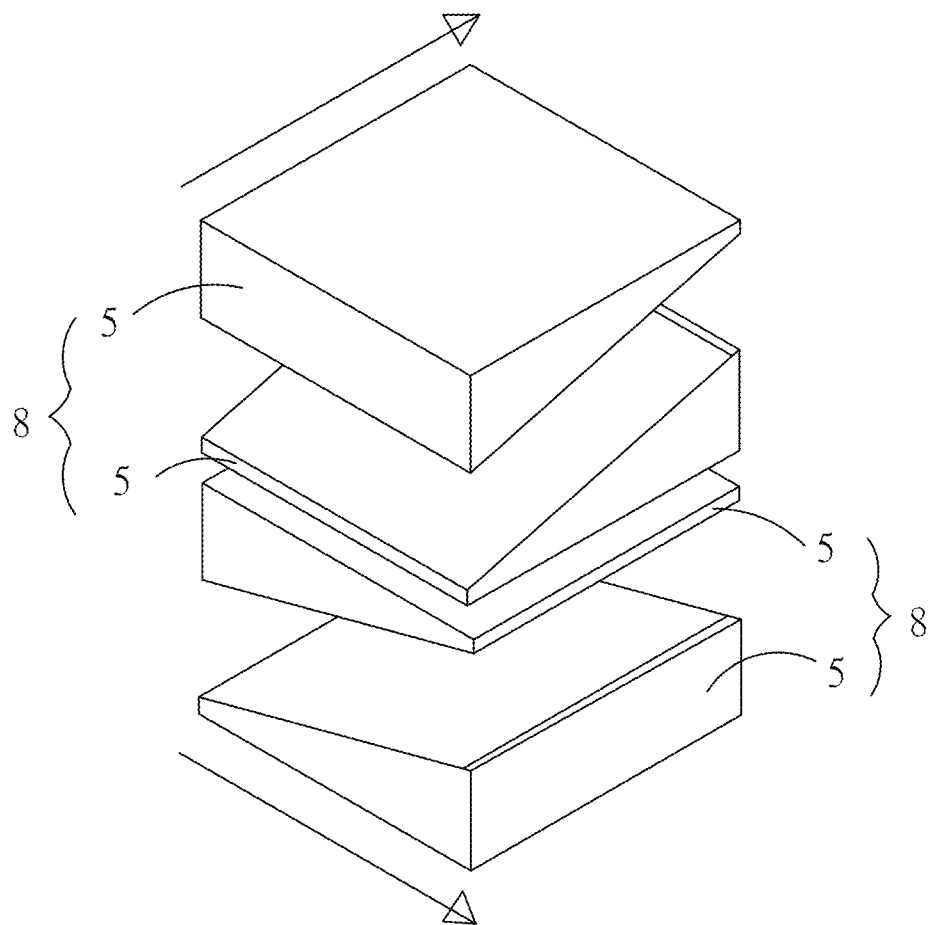
FIG. 12A
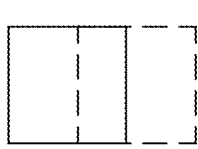  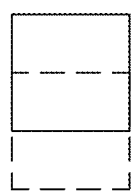  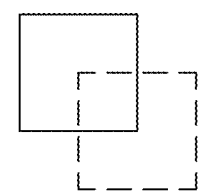
FIG. 12B          FIG. 12C          FIG. 12D

WEDGE-SHAPED LIQUID CRYSTAL CELL ARRAY CAPABLE OF CONTROLLING LIGHT ANGLE DEFLECTION

BACKGROUND OF THE INVENTION

Field of Invention

The invention relates to a wedge-shaped liquid crystal cell array capable of controlling light angle deflection that utilizes a special wedge-shaped angle liquid crystal layer and an electro-optical effect of liquid crystal to control an angle of reflected light and deflection of transmitted light.

Related Art

Conventional microelectromechanical digital reflectors have been widely used in projection display products and scientific purposes. However, the manufacturing and packaging of micro reflector arrays are relatively difficult and the costs are relatively high. The industry needs product alternatives with the same functionality and simple architecture.

The electro-optical effects are a general term for various changes in the optical properties of objects under the action of an external electric field. These different electro-optical effects can be divided into two categories: changes in refractive index and dielectric constant.

Pockels effect (also known as linear electro-optical effect): the change in the refractive index of crystal caused by an external electric field is directly proportional to the electric field strength, only crystals without inversion symmetry can produce the Pockels effect.

Kerr effect (also known as second-order nonlinear electro-optical effect): the change in the refractive index of crystal caused by an external electric field is directly proportional to the square of the electric field intensity, any crystal can produce the Kerr effect, but the intensity of this effect is much lower than that of the Pockels effect.

Uniaxial optical crystal has two different principal refractive indexes, namely o light refractive index no and e light refractive index ne. Due to the anisotropy of the refractive index, the birefringence of crystal results in many useful optical properties. After applying an electric field, liquid crystal has the same optical properties as optical crystal.

In the electrically controlled birefringence effect, applying an electric field to liquid crystal can change the alignment direction of the liquid crystal. Therefore, light incident in a certain polarization direction will undergo birefringence in the liquid crystal. Generally speaking, the refractive index of liquid crystal when no electric field is applied is no. When an electric field is applied, the refractive index is ne. The difference between the two, $\Delta n = n_e - n_o$, will be the main physical principle used in the invention.

In addition, the spatial light modulator-digital micromirror device (DMD) was invented by L. J. Hornbeck, a scientist from Texas Instruments (TI) in the United States in 1982. DMD is a device composed of a high-speed digital optical reflective switch array based on semiconductor manufacturing technology. The imaging pattern and its characteristics are determined by controlling the rotation of the microlens around a fixed axis (yoke) and the time domain response (determining the reflection angle and dwell time of light). It is a new, fully digital flat display device uses MEMS (micro electromechanical system) technics to integrate the reflective micromirror array and CMOS SRAM on the same chip. At present, it is not only used in high-definition TV (HDTV) and digital projection display, in recent years, its application fields have been greatly expanded. It has been successfully applied in fiber optic communication network routers, attenuators and filters, digital cameras, high-frequency antenna arrays, new generation outer space telescopes, rapid prototyping systems, three-dimensional object profile measuring instrument, holography, digital image processing joint transform correlators, optical neural networks, lithography, digital iris diaphragms in microscopy systems, and spatial imaging spectroscopy. Although the digital micromirror is a mature component, there are still problems such as very complex design and manufacturing processes, high costs, and mechanical components that will wear out after a long time of use.

Therefore, the inventor of the invention and relevant manufacturers engaged in this industry are eager to research and make improvement to solve the above-mentioned problems and drawbacks in the prior art.

SUMMARY OF THE INVENTION

Therefore, in order to effectively solve the above problems, a main object of the invention is to provide a wedge-shaped liquid crystal cell array capable of controlling light angle deflection that utilizes a special wedge-shaped angle liquid crystal layer and an electro-optical effect of liquid crystal to control an angle of reflected light and deflection of transmitted light.

In order to achieve the above object, the invention provides a wedge-shaped liquid crystal cell array capable of controlling light angle deflection, comprising: a wedge-shaped upper cover glass, a bottom of the wedge-shaped upper cover glass is formed with an extended slope, an included angle ω is formed between the extended slope and a horizontal axis of a starting point of the extended slope, a plurality of first transparent conductive films are attached to the extended slope, the first transparent conductive films are disposed in a gradually lengthening manner, a transparent insulating layer is disposed between the adjacent first transparent conductive films, a first alignment film is attached to another side of the first transparent conductive film opposite to the extended slope, a refractive index of the wedge-shaped upper cover glass is $n_1$; a liquid crystal layer, an upper side of the liquid crystal layer is attached to the first alignment film of the wedge-shaped upper cover glass, a refractive index of the liquid crystal layer is $n_2$; and a base glass, the base glass and the wedge-shaped upper cover glass form an accommodating space, the liquid crystal layer is disposed in the accommodating space, at least one second transparent conductive film is attached to a top side of the base glass, a second alignment film is attached to another side of the second transparent conductive film opposite to the base glass, and another side of the second alignment film is attached to a bottom surface of the liquid crystal layer to form a transmissive wedge-shaped liquid crystal cell; wherein when the first transparent conductive film and the second transparent conductive film do not conduct electricity, $n_1 > n_2$, when the first transparent conductive film and the second transparent conductive film conduct electricity, $n_1 = n_2$.

According to one embodiment of the wedge-shaped liquid crystal cell array capable of controlling light angle deflection, wherein an emergent light angle of the transmissive wedge-shaped liquid crystal cell is $\theta_{out}$ and an incident light angle of the transmissive wedge-shaped liquid crystal cell is $\theta_{in}$, a limiting condition for the included angle ω formed between the extended slope and the horizontal axis of the starting point of the extended slope is $$|\omega| < \sin^{-1}\left(\frac{1}{n_1}\right),$$

and the emergent light angle is determined according to the following formula: $\theta_{in}+\Delta n\omega$.

According to one embodiment of the wedge-shaped liquid crystal cell array capable of controlling light angle deflection, wherein two sets of the transmissive wedge-shaped liquid crystal cells are stacked, the base glass of the upper transmissive wedge-shaped liquid crystal cell is connected to the base glass of the lower transmissive wedge-shaped liquid crystal cell, a direction of the extended slope of the upper transmissive wedge-shaped liquid crystal cell is the same as a direction of the extended slope of the lower transmissive wedge-shaped liquid crystal cell to form a pixel displacement wedge-shaped liquid crystal cell module, and a light emission position of a transmitted light is controlled by conductive configurations of the first transparent conductive film and the second transparent conductive film of each of the transmissive wedge-shaped liquid crystal cells.

According to one embodiment of the wedge-shaped liquid crystal cell array capable of controlling light angle deflection, wherein a deflection amount of a light ray position of a transmitted light of the pixel displacement wedge-shaped liquid crystal cell module is determined according to the following formula:

$$d = h\omega\left(\frac{n_1}{n_2} - 1\right)(1 - \omega^2),$$

wherein the deflection amount of the light ray position is d, and a thickness of the liquid crystal layer is h.

According to one embodiment of the wedge-shaped liquid crystal cell array capable of controlling light angle deflection, wherein two sets of the pixel displacement wedge-shaped liquid crystal cell modules are stacked, a direction of the extended slope of the upper pixel displacement wedge-shaped liquid crystal cell module is different from a direction of the extended slope of the lower pixel displacement wedge-shaped liquid crystal cell module, and a light emission position of a transmitted light is controlled by conductive configurations of the first transparent conductive film and the second transparent conductive film of each of the pixel displacement wedge-shaped liquid crystal cell modules.

According to one embodiment of the wedge-shaped liquid crystal cell array capable of controlling light angle deflection, wherein a reflective film is provided on a bottom side of the base glass to form a reflective wedge-shaped liquid crystal cell.

According to one embodiment of the wedge-shaped liquid crystal cell array capable of controlling light angle deflection, wherein a reflected light angle of the reflective wedge-shaped liquid crystal cell is $\theta_{out}$ and an incident light angle of the reflective wedge-shaped liquid crystal cell is $\theta_{in}$, a limiting condition for the included angle $\omega$ formed between the extended slope and the horizontal axis of the starting point of the extended slope is $$|\omega| < \sin^{-1}\left(\frac{1}{n_1}\right),$$

and the reflected light angle is determined according to the following formula: $\theta_{out}=-2\Delta n\omega-\theta_{in}$.

According to one embodiment of the wedge-shaped liquid crystal cell array capable of controlling light angle deflection, wherein the transmissive wedge-shaped liquid crystal cell is stacked on the reflective wedge-shaped liquid crystal cell, a direction of the extended slope of the transmissive wedge-shaped liquid crystal cell is opposite to a direction of the extended slope of the reflective wedge-shaped liquid crystal cell, and a light emission direction of a reflected light is controlled by conductive configurations of the first transparent conductive films and the second transparent conductive films of the transmissive wedge-shaped liquid crystal cell and the reflective wedge-shaped liquid crystal cell.

According to one embodiment of the wedge-shaped liquid crystal cell array capable of controlling light angle deflection, wherein the transmissive wedge-shaped liquid crystal cell is stacked on the reflective wedge-shaped liquid crystal cell, a direction of the extended slope of the transmissive wedge-shaped liquid crystal cell is the same as a direction of the extended slope of the reflective wedge-shaped liquid crystal cell, and a light emission direction of a reflected light is increased by conductive configurations of the first transparent conductive films and the second transparent conductive films of the transmissive wedge-shaped liquid crystal cell and the reflective wedge-shaped liquid crystal cell.

According to one embodiment of the wedge-shaped liquid crystal cell array capable of controlling light angle deflection, wherein the transmissive wedge-shaped liquid crystal cell is stacked on the reflective wedge-shaped liquid crystal cell, alignment directions of the first alignment film and the second alignment film of the transmissive wedge-shaped liquid crystal cell and the first alignment film and the second alignment film of the reflective wedge-shaped liquid crystal cell are perpendicular to one another, so that an incident light enters from the transmissive wedge-shaped liquid crystal cell and penetrates to reach the reflective wedge-shaped liquid crystal cell, and becomes a reflected light with P-polarized light and S-polarized light with an angular shift.

According to one embodiment of the wedge-shaped liquid crystal cell array capable of controlling light angle deflection, wherein two sets of the transmissive wedge-shaped liquid crystal cells stacked on each other are stacked on the reflective wedge-shaped liquid crystal cell, an included angle $\omega_B$ is formed between the extended slope of the reflective wedge-shaped liquid crystal cell and a horizontal axis of a starting point of the extended slope, an included angle $\omega_{G-B}$ is formed between the extended slope of the lower transmissive wedge-shaped liquid crystal cell and the horizontal axis of the starting point of the extended slope, an included angle $\omega_{R-B}$ is formed between the extended slope of the upper transmissive wedge-shaped liquid crystal cell and the horizontal axis of the starting point of the extended slope, when processing blue light angle compensation, the first transparent conductive film and the second transparent conductive film of the reflective wedge-shaped liquid crystal cell do not conduct electricity, the first transparent conductive films and the second transparent conductive films of the two sets of the transmissive wedge-shaped liquid crystal cells conduct electricity, when processing green light angle compensation, the first transparent conductive film and the second transparent conductive film of the reflective wedge-shaped liquid crystal cell do not conduct electricity, the first transparent conductive film and the second transparent conductive film of the lower transmissive wedge-shaped liquid crystal cell do not conduct electricity, the first transparent conductive film and the second transparent conductive film of the upper transmissive wedge-shaped liquid crystal cell conduct electricity, when processing red light angle compensation, the first transparent conductive film and the second transparent conductive film of the reflective wedge-shaped liquid crystal cell do not conduct electricity, the first transparent conductive film and the second transparent conductive film of the upper transmissive wedge-shaped liquid crystal cell do not conduct electricity, and the first transparent conductive film and the second transparent conductive film of the lower transmissive wedge-shaped liquid crystal cell conduct electricity.

According to one embodiment of the wedge-shaped liquid crystal cell array capable of controlling light angle deflection, further comprising an electrically controlled phase liquid crystal cell, the electrically controlled phase liquid crystal cell is disposed above the wedge-shaped upper cover glass, turn-on and turn-off of the electrically controlled phase liquid crystal cell control the entry of light of different phases and make a reflected light become a light with a same phase as the liquid crystal cell.

BRIEF DESCRIPTION OF THE DRAWINGS

FIG. 6C is a fifth schematic diagram of implementation of turn-on of the reflective wedge-shaped liquid crystal cell of the invention.

FIG. 6D is a schematic diagram of a reflector with a deflection angle.

FIG. 6E is a schematic diagram of implementation of turn-on of the transmissive wedge-shaped liquid crystal cell of the invention.

FIG. 12A is a schematic diagram of implementation of vector pixel displacement effect of the invention.

FIG. 12B is a schematic diagram of implementation of shifting a pixel in the X direction of the invention.

FIG. 12C is a schematic diagram of implementation of shifting a pixel in the Y direction of the invention.

FIG. 12D is a schematic diagram of implementation of shifting a pixel in the XY direction of the invention.

DETAILED DESCRIPTION OF THE INVENTION

The above objects of the invention, as well as its structural and functional features, will be described in accordance with the preferred embodiments of the accompanying drawings.

In the following, for the formation and technical content related to a wedge-shaped liquid crystal cell array capable of controlling light angle deflection of the invention, various applicable examples are exemplified and explained in detail with reference to the accompanying drawings; however, the invention is of course not limited to the enumerated embodiments, drawings, or detailed descriptions.

Furthermore, those who are familiar with this technology should also understand that the enumerated embodiments and accompanying drawings are only for reference and explanation, and are not used to limit the invention; other modifications or alterations that can be easily implemented based on the detailed descriptions of the invention are also deemed to be within the scope without departing from the spirit or intention thereof as defined by the appended claims and their legal equivalents.

And, the directional terms mentioned in the following embodiments, for example: "above", "below", "left", "right", "front", "rear", etc., are only directions referring in the accompanying drawings. Therefore, the directional terms are used to illustrate rather than limit the invention. In addition, in the following embodiments, the same or similar elements will be labeled with the same or similar numbers.

Figure 1A:
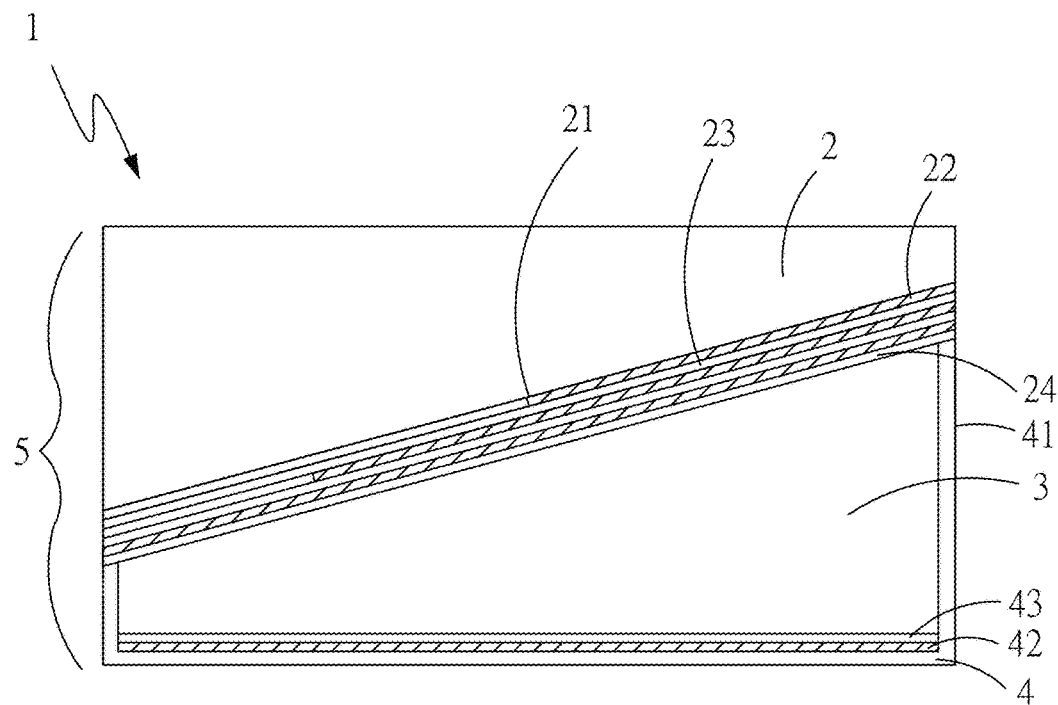
FIG. 1A is a cross-sectional view of a transmissive wedge-shaped liquid crystal cell of the invention.

First of all, composition of a wedge-shaped liquid crystal cell is shown in FIG. 1A, which is a cross-sectional view of a transmissive wedge-shaped liquid crystal cell of the invention. It can be clearly seen from the figure that a wedge-shaped liquid crystal cell 1 comprises a wedge-shaped upper cover glass 2, a liquid crystal layer 3 and a base glass 4.

Wherein the wedge-shaped upper cover glass 2 has its own refractive index, in this embodiment, a refractive index of the wedge-shaped upper cover glass 2 is defined as $n_1$, an extended slope 21 is formed at a bottom of the wedge-shaped upper cover glass 2, and an included angle is formed between the extended slope 21 and a horizontal axis of a starting point of the extended slope 21. A plurality of first transparent conductive films 22 are attached to the extended slope 21. The first transparent conductive films 22 are electrodes for applying an electric field, the first transparent conductive films 22 are disposed with different lengths, and the first transparent conductive films 22 are disposed in a gradually lengthening manner from top to bottom. A transparent insulating layer 23 is respectively provided between the adjacent first transparent conductive films 22, and a first alignment film 24 is attached to another side of the bottom first transparent conductive film 22 opposite to the extended slope 21.

Wherein an upper side of the liquid crystal layer 3 is attached to the first alignment film 24 of the wedge-shaped upper cover glass 2, and the first alignment film 24 is used to control a directionality of liquid crystal molecules. In this embodiment, a refractive index of the liquid crystal layer 3 is defined as $n_2$, and the liquid crystal layer 3 must have relatively significant birefringence differential characteristics in conjunction with changes in an electric field. Wherein the refractive index $n_2$ of the liquid crystal layer 3 applied with an electric field is a refractive index $n_{2e}$ (high refractive index), while the refractive index $n_2$ of the liquid crystal layer 3 without applying with an electric field is a refractive index $n_{2o}$ (low refractive index). In this embodiment, in addition, liquid crystals of the liquid crystal layer 3 are a liquid crystal material with obvious electro-optical effect.

Wherein the base glass 4 is disposed below the wedge-shaped upper cover glass 2, an accommodating space 41 is formed between the base glass 4 and the wedge-shaped upper cover glass 2, and the accommodating space 41 is filled with liquid crystals to form the liquid crystal layer 3. At least one second transparent conductive film 42 is attached to a top side of the base glass 4, a second alignment film 43 is attached to another side of the second transparent conductive film 42 opposite to the base glass 4, and another side of the second alignment film 43 is attached to a bottom surface of the liquid crystal layer 3 to form a transmissive wedge-shaped liquid crystal cell 5. Wherein when the first transparent conductive film 22 and the second transparent conductive film 42 of the transmissive wedge-shaped liquid crystal cell 5 do not conduct electricity (that is, when an electric field is zero), $n_1 > n_2$ (that is $n_1 > n_{2o}$), when the first transparent conductive film 22 and the second transparent conductive film 42 conduct electricity (that is, when a sufficiently large electric field is generated), $n_1 = n_2$ (i.e., $n_1 = n_{2e}$).

Figure 1B:
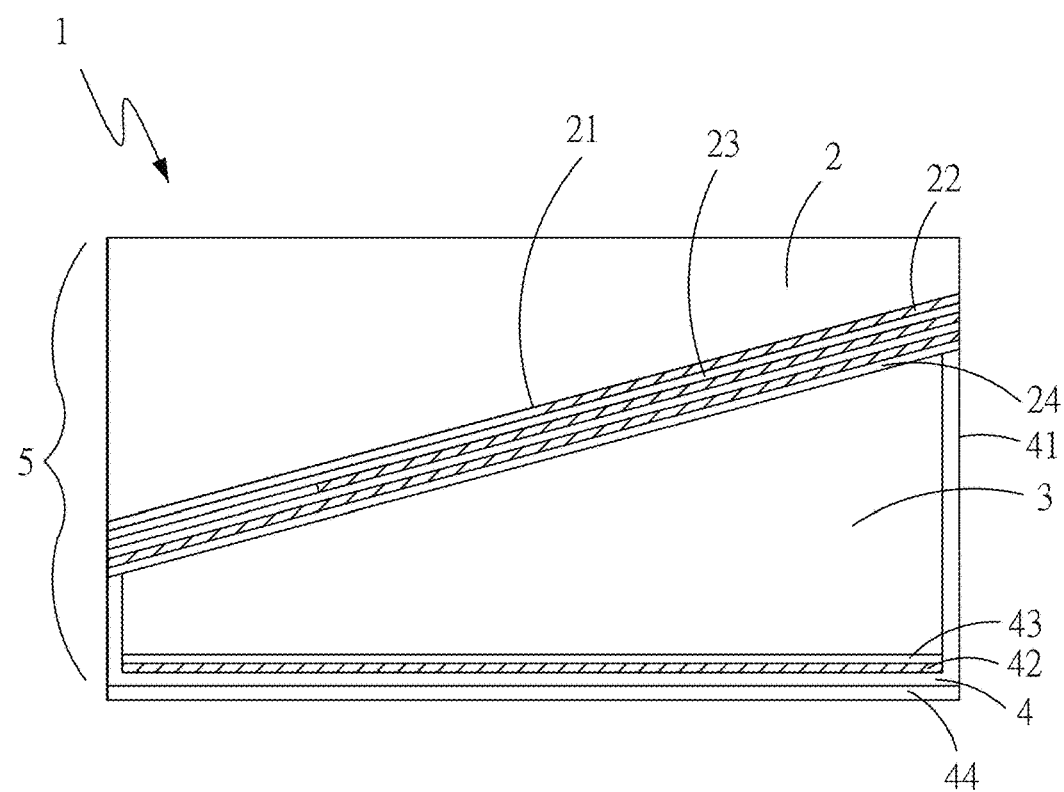
FIG. 1B is a cross-sectional view of a reflective wedge-shaped liquid crystal cell of the invention.
Figure 2A:
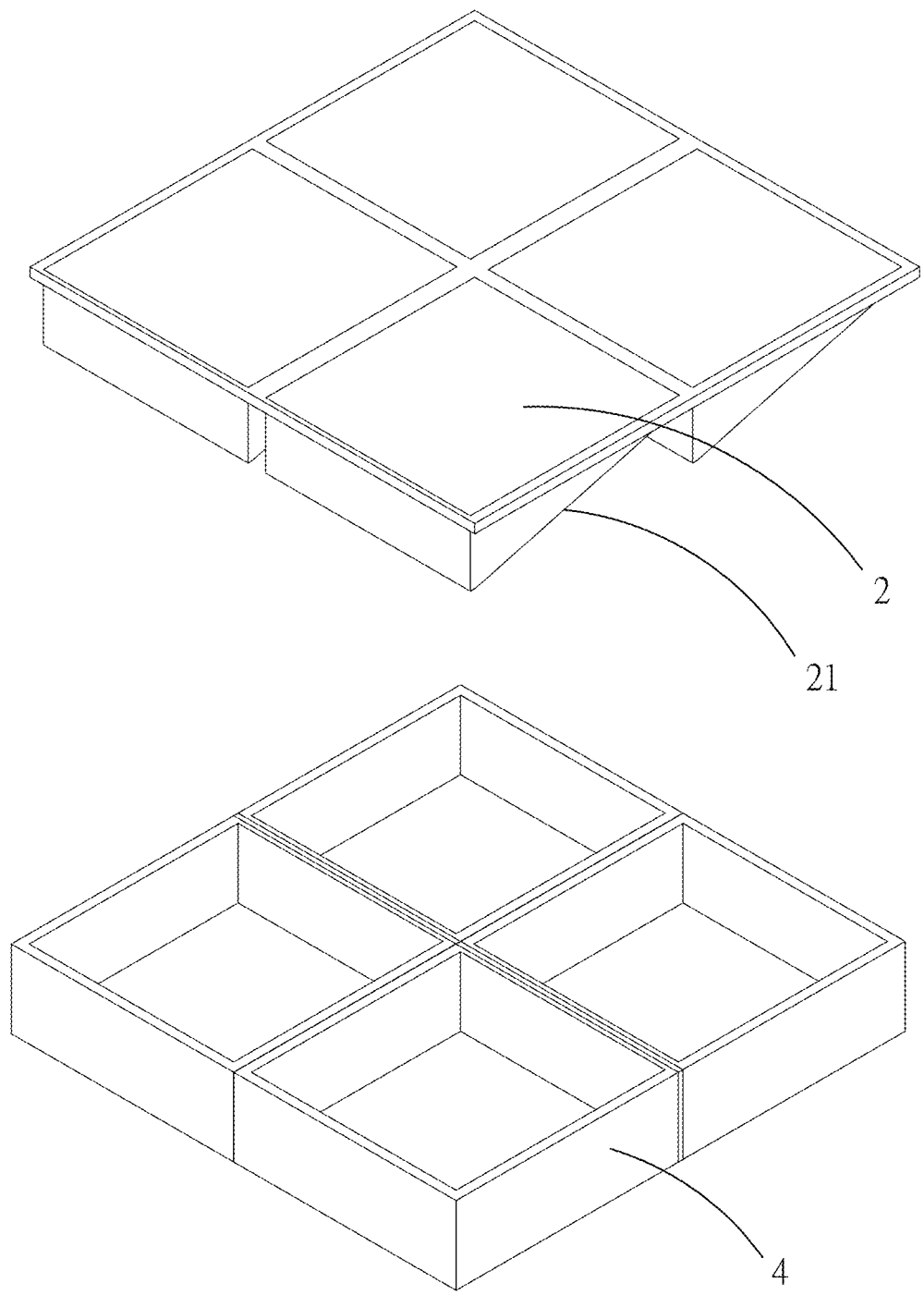
FIG. 2A is a perspective exploded view of a wedge-shaped liquid crystal cell assembly array of the invention.

Please refer to FIG. 1B for a cross-sectional view of a reflective wedge-shaped liquid crystal cell of the invention. It can be clearly seen from the figure that the wedge-shaped liquid crystal cell 1 comprises the wedge-shaped upper cover glass 2, the liquid crystal layer 3 and the base glass 4, wherein a reflective film 44 is disposed on a bottom side of the base glass 4 to form a reflective wedge-shaped liquid crystal cell 6.

Wherein when the first transparent conductive films 22 and the second transparent conductive films 42 of the transmissive wedge-shaped liquid crystal cell 5 and the reflective wedge-shaped liquid crystal cell 6 are turned on, it represents the first transparent conductive films 22 and the second transparent conductive films 42 do not conduct electricity (no voltage is applied), so the liquid crystal layer 3 is not affected by an electric field. At this time, a refractive index of the liquid crystal layer 3 is $n_{2o}$, through $\Delta n = n_{2e} -$ $n_{2o}=n_1-n_{2o}\neq 0$, resulting in a light deflection effect. When the first transparent conductive film 22 and the second transparent conductive film 42 of the transmissive wedge-shaped liquid crystal cell 5 are turned off, it represents that the first transparent conductive film 22 and the second transparent conductive film 42 conduct electricity (positive voltage is applied), so the liquid crystal layer 3 is affected by an electric field. At this time, a refractive index of the liquid crystal layer 3 is $n_{2e}$, through $\Delta n=n_{2e}-n_{2e}=0$, no light deflection effect occurs In addition, please refer to FIG. 2A. After combining the transmissive wedge-shaped liquid crystal cells 5 or the reflective wedge-shaped liquid crystal cells 6, they can be configured in an array form to achieve an efficacy of multi-point reflection.

Figure 2B:
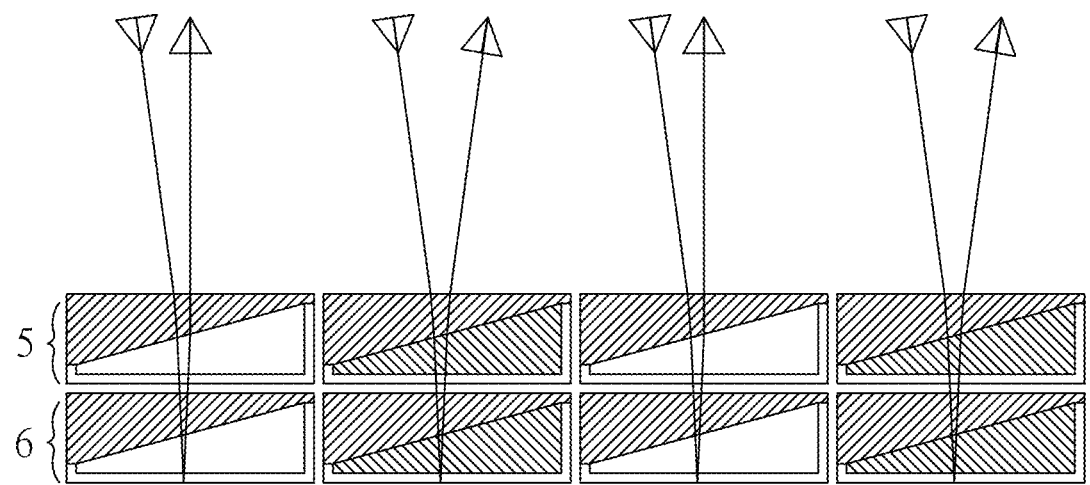
FIG. 2B is a cross-sectional view of the wedge-shaped liquid crystal cell assembly array of the invention.

Please refer to FIG. 2B. In an array form, the transmissive wedge-shaped liquid crystal cells 5 and the reflective wedge-shaped liquid crystal cells 6 can also be stacked to form a stacked array structure to further control an angle of reflected light at each point. The more a number of stacked layers, the more angles a reflected light at each point can be changed, which can be changed according to actual requirements of use, and is not limited by the embodiments.

Figure 3:
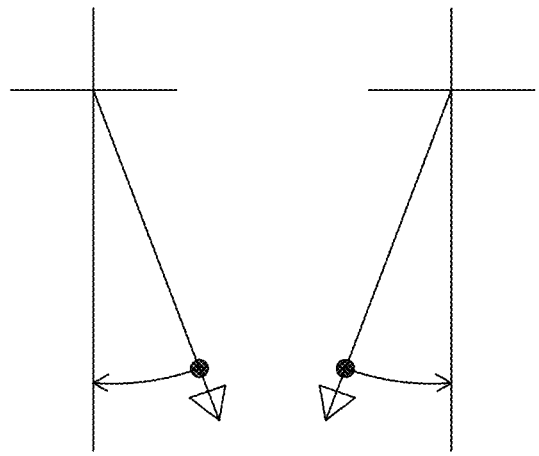
FIG. 3 is a diagram showing positive and negative angles of light in the wedge-shaped liquid crystal cell of the invention.
Figure 3:
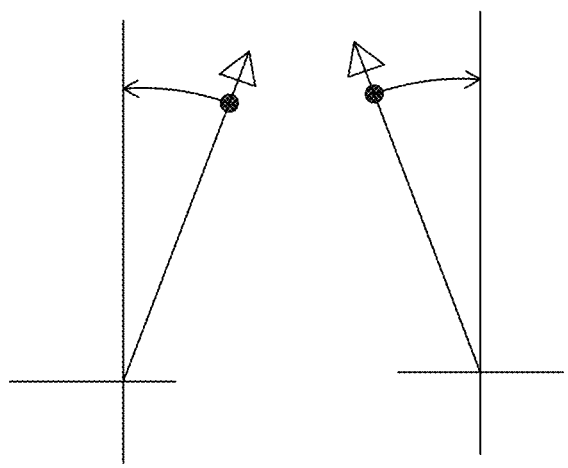
Figure 3:
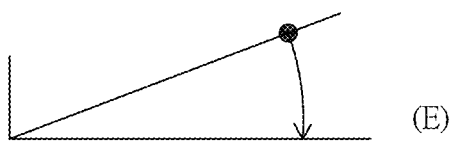

In this embodiment, positive and negative signs of deflection angles of incident light ray and emergent light ray are explained. FIG. 3 shows positive and negative signs of deflection angles of incident light ray and emergent light ray. Wherein an angle of a light ray starting from a light ray arrow to a vertical axis clockwise is negative, counterclockwise is positive; as shown in (A), the arrow to the vertical axis clockwise is negative; as shown in (B), the arrow to the vertical axis counterclockwise is positive; as shown in (C), the arrow to the vertical axis counterclockwise is positive; as shown in (D), the arrow to the vertical axis clockwise is negative; an included angle formed between the extended slope 21 and a horizontal axis of a starting point of the extended slope 21 is defined as ω. Wherein between the extended slope 21 and the horizontal axis of the starting point of the extended slope 21, clockwise is positive, counterclockwise is negative; so the positive and negative of ω represent deflection directions of the extended slope 21, as shown in (E): ω is positive. In addition, wherein the transmissive wedge-shaped liquid crystal cell 5 and the reflective wedge-shaped liquid crystal cell 6 mainly receive an incident light ray. The incident light ray passes through the transmissive wedge-shaped liquid crystal cell 5 and the reflective wedge-shaped liquid crystal cell 6 and generates an emergent light ray of transmitted light and reflected light.

Figure 4A:
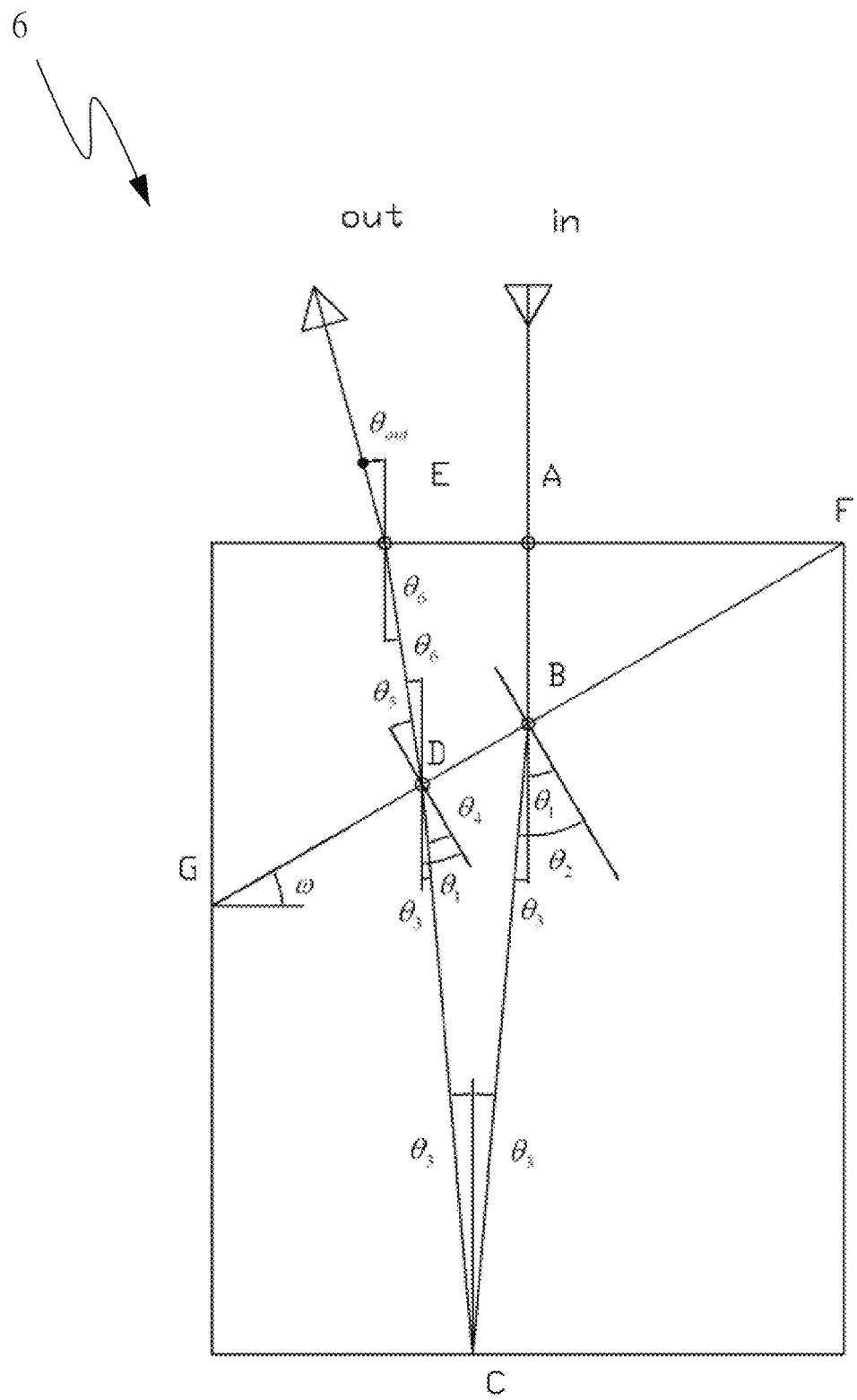
FIG. 4A is a first schematic diagram of implementation of the reflective wedge-shaped liquid crystal cell of the invention.

Furthermore, for derivation of a deflection formula of the reflective wedge-shaped liquid crystal cell 6 for vertical incident light, please refer to FIG. 4A, a first schematic diagram of implementation of the reflective wedge-shaped liquid crystal cell of the invention. Wherein the reflective wedge-shaped liquid crystal cell 6 has the wedge-shaped upper cover glass 2, the extended slope 21, the liquid crystal layer 3 and the base glass 4 as a main schematic diagram, wherein the base glass 4 has the reflective film 44, and the deflection formula of the reflective wedge-shaped liquid crystal cell 6 for vertical incident light is derived as follows.

Here, a relational expression of $\theta_{out}$, ω from point A to point E is derived, $n_1$: a value of a refractive index of the wedge-shaped upper cover glass is equal to $n_{2e}$ of liquid crystal;
$n_2$: liquid crystal refractive index $n_{2o}$;
ω: angle of the wedge-shaped upper cover glass;
$\theta_1$: included angle between incident light at point B and normal line of wedge-shaped surface;
$\theta_2$: included angle between refracted light at point B and normal line of wedge-shaped surface;
$\theta_3$: included angle between reflected light at point C and normal line of the base glass;
$\theta_4$: included angle between reflected light at point D and normal line of wedge-shaped surface;
$\theta_5$: included angle between refracted light at point D and normal line of wedge-shaped surface;
$\theta_6$: included angle between refracted light and incident light in the glass at point E;
$\theta_{out}$: included angle between refracted light and incident light outside the glass at point E;
point A: junction point where incident light passes through the air and the upper cover glass;
point B: junction point where incident light passes through the upper cover glass and liquid crystal;
point C: reflection point of incident light through the base glass;
point D: junction point where reflected light passes through liquid crystal and the upper cover glass;
point E: junction point where reflected light passes through the upper cover glass and air;
point F: ending point of the extended slope;
point G: starting point of the extended slope;

$$\text{point A: } \theta_1 = -\omega \tag{1}$$

$$\text{point B: } n_1 \sin\theta_1 = n_2 \sin\theta_2 \tag{2}$$

$$\text{point C: } \theta_3 = \theta_2 - \theta_1 \tag{3}$$

$$\text{point D: } \theta_4 = \theta_1 - \theta_3 \tag{4}$$

$$n_2 \sin\theta_4 = n_1 \sin\theta_5 \tag{5}$$

$$\text{point E: } \theta_6 = \theta_1 - \theta_5 \tag{6}$$

$$n_1 \sin\theta_6 = \sin\theta_{out} \tag{7}$$

Approximately simplify formulas (1)~(7)

Generally speaking, when an angle is <30° (small-angle approximation), $\sin\theta \cong \theta$. In the following we will use this approximate expression to derive the formula to make the formula simpler.

$$\text{point } A: \theta_1 = -\omega \tag{8}$$

$$\text{point } B: n_1\theta_1 = n_2\theta_2 \tag{9}$$

$$\theta_2 = \left(\frac{n_1}{n_2}\right)\theta_1 = \left(\frac{n_1}{n_2}\right)(-\omega) \tag{10}$$

$$\text{point } C: \theta_3 = \theta_2 - \theta_1 = \left(\frac{n_1}{n_2} - 1\right)(-\omega) \tag{11}$$

$$\text{point } D: \theta_4 = \theta_1 - \theta_3 = \left(2 - \frac{n_1}{n_2}\right)(-\omega) \tag{12}$$

$$n_2\theta_4 = n_1\theta_5 \tag{13}$$

$$\theta_5 = \frac{n_2}{n_1}\theta_4 = \left(\frac{n_2}{n_1}\right)\left(2 - \frac{n_1}{n_2}\right)(-\omega) = \left[2\left(\frac{n_2}{n_1}\right) - 1\right](-\omega) \tag{14}$$

$$\text{point } E: \theta_6 = \tag{15}$$

$$\theta_1 - \theta_5 = \left[1 - \left(\frac{n_2}{n_1}\right)\left(2 - \frac{n_1}{n_2}\right)\right](-\omega) = 2\left(1 - \frac{n_2}{n_1}\right)(-\omega)$$

$$\theta_{out} = n_1\theta_6 = 2(n_1 - n_2)(-\omega) = -2\Delta n\omega \tag{16}$$

$$\text{limiting condition 1: } n_1 > n_2 \tag{17}$$

when light is incident from a dense medium to point B of a less dense medium, total reflection cannot occur, formula (2)

$$n_1 \sin|\theta_1| < 1 \tag{18}$$

$$\theta_1 = -\omega \tag{19}$$

$$|\omega| < \sin^{-1}\left(\frac{1}{n_1}\right) \tag{20}$$

limiting condition 2:
consider that total reflection may occur at point E; this is also an undesirable situation; therefore from formula (7) $n_1 \sin\theta_6 = \sin\theta_{out} < 1$ \hfill (21)

$$|\omega| < \frac{1}{2\Delta n}\left(\frac{\pi}{2}\right) \tag{22}$$

because normally, $\frac{1}{2\Delta n} > 1$ \hfill (23)

formula (21) is obviously consistent.

Design embodiments of the reflective wedge-shaped liquid crystal cell 6 for vertical incident light are as follows.

Assuming an angle $\omega = 15°$ of the wedge-shaped upper cover glass 2 of the reflective wedge-shaped liquid crystal cell 6, $n_1 = 1.7859$ a liquid crystal material uses Merck's E44 liquid crystal, and light is vertically incident on the reflective wedge-shaped liquid crystal cell 6

$$n_{2e} = n_1 = 1.7859$$

$$n_{2o} = n_2 = 1.5278$$

point $A: \theta_1 = -\omega = -15°$ point $B: n_1\theta_1 = n_2\theta_2$ $$\theta_2 = \left(\frac{n_1}{n_2}\right)\theta_1 = \left(\frac{n_1}{n_2}\right)(-\omega) = -17.53°$$

point $C: \theta_3 = \theta_2 - \theta_1 = \left(\frac{n_1}{n_2} - 1\right)(-\omega) = -2.53°$ point $D: \theta_4 = \theta_1 - \theta_3 = \left(2 - \frac{n_1}{n_2}\right)(-\omega) = -12.46°$ $$n_2\theta_4 = n_1\theta_5$$

$$\theta_5 = \frac{n_2}{n_1}\theta_4 = \left(\frac{n_2}{n_1}\right)\left(2 - \frac{n_1}{n_2}\right)(-\omega) = \left[2\left(\frac{n_2}{n_1}\right) - 1\right](-\omega) = -10.66°$$

point $E: \theta_6 = \theta_1 - \theta_5 = \left[1 - \left(\frac{n_2}{n_1}\right)\left(2 - \frac{n_1}{n_2}\right)\right](-\omega) = 2\left(1 - \frac{n_2}{n_1}\right)(-\omega) = -4.33°$ $$\theta_{out} = n_1\theta_6 = 2(n_1 - n_2)(-\omega) = -7.743°$$

Calculation of limiting condition:
formula (17) $n_1 > n_2$, $1.7859 > 1.5278$ is consistent with no problem.

$$|\omega| < \sin^{-1}\left(\frac{1}{n_1}\right), \omega < 29.246° \quad \text{formula (20)}$$

is consistent with no problem.

Figure 4B:
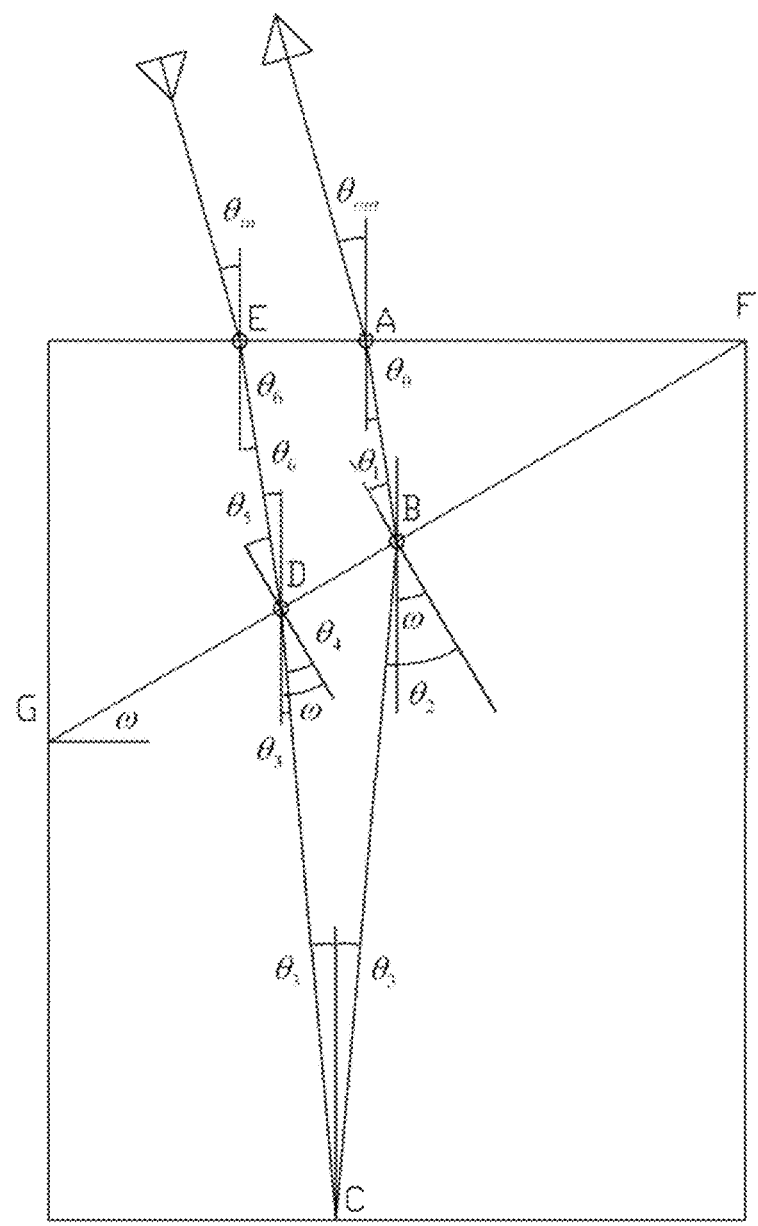
FIG. 4B is a second schematic diagram of implementation of the reflective wedge-shaped liquid crystal cell of the invention.

Furthermore, for derivation of a deflection formula of the reflective wedge-shaped liquid crystal cell 6 for oblique incident light, please refer to FIG. 4B, a second schematic diagram of implementation of the reflective wedge-shaped liquid crystal cell of the invention. Wherein the reflective wedge-shaped liquid crystal cell 6 has the wedge-shaped upper cover glass 2, the extended slope 21, the liquid crystal layer 3 and the base glass 4 as a main schematic diagram, wherein the base glass 4 has the reflective film 44, and the deflection formula of the reflective wedge-shaped liquid crystal cell 6 for oblique incident light is derived as follows.

Here, relational expressions of incident light $\theta_{in}$, emergent light $\theta_{out}$ from point E to point A are derived, $n_1$: a value of a refractive index of the wedge-shaped upper cover glass is equal to $n_{2e}$ is of liquid crystal;

$n_2$: liquid crystal refractive index $n_{2o}$;

$\theta$: angle of the wedge-shaped upper cover glass;

$\theta_{in}$: included angle between oblique incident light on the upper cover glass and plane vertical line at point E;

$\theta_6$: included angle between refracted light in the upper cover glass and plane vertical line at point E;

$\theta_5$: included angle between refracted light at point D and normal line of wedge-shaped surface;

$\theta_4$: included angle between refracted light at point D and normal line of wedge-shaped surface;

$\theta_3$: included angle between refracted light at point C and normal line of the base glass;

$\theta_2$: included angle between reflected light at point B and normal line of wedge-shaped surface;

$\theta_1$: included angle between refracted light at point B and normal line of wedge-shaped surface;

$\theta_o$: in the glass at point A, included angle between light exiting the upper cover glass and vertical line;

$\theta_{out}$: outside the glass at point A, included angle between light exiting the upper cover glass and vertical line;

point E: junction point where incident light passes through liquid crystal and the upper cover glass;

point D: junction point where incident light passes through the upper cover glass and liquid crystal;

point C: reflection point of incident light through the base glass;

point B: junction point where reflected light passes through liquid crystal and the upper cover glass;

point A: junction point where light reflects off the upper cover glass and enters the air;

point F: ending point of the extended slope;

point G: starting point of the extended slope;

point $E: \theta_{in} = n_1\theta_6$ \hfill (24)

$$\theta_6 = -\omega - \theta_5 \tag{25}$$

$$\theta_5 = -\omega - \theta_6 = -\omega - \frac{\theta_{in}}{n_1} \tag{26}$$

point $D: n_2\theta_4 = n_1\theta_5$ \hfill (27)

$$\theta_4 = -\omega - \theta_3 \tag{28}$$

$$\theta_3 = -\omega - \theta_4 = -\omega - \frac{n_1}{n_2}\theta_5 = -\omega - \frac{n_1}{n_2}\left(-\omega - \frac{\theta_{in}}{n_1}\right) = -\omega - \frac{-n_1\omega - \theta_{in}}{n_2} \tag{29}$$

point $C: \theta_3 = \theta_2 + \omega$ \hfill (30)

$$\theta_2 = \theta_3 - \omega = -\omega - \frac{n_1}{n_2}\left(-\omega - \frac{\theta_{in}}{n_1}\right) - \omega = -2\omega + \frac{n_1}{n_2}\omega + \frac{\theta_{in}}{n_2} \tag{31}$$

point $B: n_1\theta_1 = n_2\theta_2$ \hfill (32)

$$\theta_1 = \frac{n_2}{n_1}\theta_2 = \left(\frac{n_2}{n_1}\right)\left(-2\omega + \frac{n_1}{n_2}\omega + \frac{\theta_{in}}{n_2}\right) = \frac{-2n_2\omega + n_1\omega + \theta_{in}}{n_1} \tag{33}$$

-continued $$\text{point } A: \theta_0 = -(\omega + \theta_1) \quad (34)$$

$$\theta_{out} = n_1\theta_0 \quad (35)$$

$$\theta_{out} = -2\Delta n\omega - \theta_{in} \quad (36)$$

Design embodiments of the reflective wedge-shaped liquid crystal cell 6 for oblique incident light are as follows.

$$\text{Assuming } \theta_{in} = -2\Delta n\omega \quad (37)$$

$$\theta_1 = \frac{-2n_2\omega + n_1\omega - 2n_1\omega + 2n_2\omega}{n_1} = -\omega \quad (38)$$

$$\theta_{out} = 0 \quad (39)$$

if $\theta_{in} = -7.743°$ $\theta_1 = -15°$ $\theta_{out} = 0°$

Therefore, this embodiment is exactly a reverse optical path of the previous reflective wedge-shaped liquid crystal cell for vertical incident light.

Figure 4C:
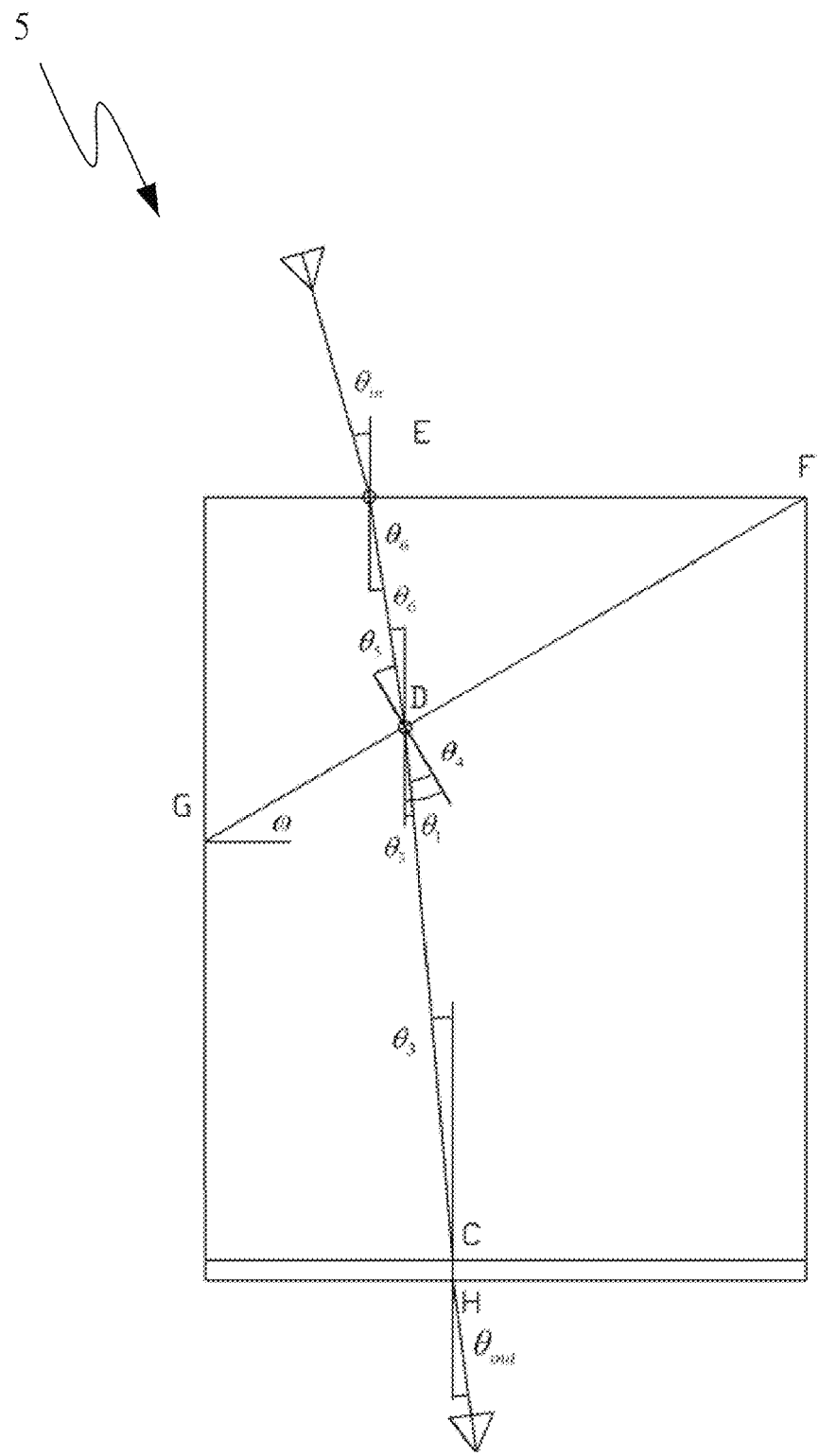
FIG. 4C is a first schematic diagram of implementation of the transmissive wedge-shaped liquid crystal cell of the invention.

Furthermore, for derivation of a deflection formula of the transmissive wedge-shaped liquid crystal cell 5 for oblique incident light, please refer to FIG. 4C, a first schematic diagram of implementation of the transmissive wedge-shaped liquid crystal cell of the invention. Wherein the transmissive wedge-shaped liquid crystal cell 5 has the wedge-shaped upper cover glass 2, the extended slope 21, the liquid crystal layer 3 and the base glass 4 as a main schematic diagram, and the deflection formula of the transmissive wedge-shaped liquid crystal cell 5 for oblique incident light is derived as follows.

In the deflection formula of the transmissive wedge-shaped liquid crystal cell 5 for oblique incident light, point C: refraction point of incident light in the base glass;
point H: refraction point of incident light outside the base glass;
$\theta_{out}$: included angle between refracted light outside the glass and vertical line at point H;

$$\theta_3 = -\omega - \frac{(-n_1\omega - \theta_{in})}{n_2} \quad (40)$$

point C: from formula (29), point H: $n_2\theta_3 = \theta_{out}$ (41)

$\theta_{out} = \theta_{in} + \Delta n\omega$ (42)

Design embodiments of the transmissive wedge-shaped liquid crystal cell 5 for oblique incident light are as follows. If incident angle $\theta_{in} = -2\Delta n\omega$, emergence angle $\theta_{out} = -\Delta n\omega$ is exactly half of $\theta_{in}$.

It can be known from the above that a conclusion of the reflective wedge-shaped liquid crystal cell 6 for vertical incident light: from the above formulas, it can be derived that when vertical light is incident, we summarize the basic effects produced by it into two types, deflection angles of vertical incident light and emergent light correspond to each other.

Figure 5A:
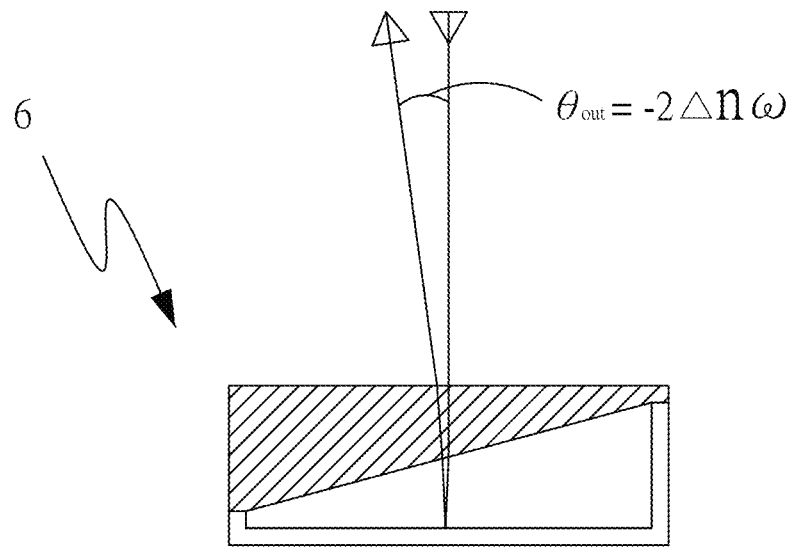
FIG. 5A is a first schematic diagram of implementation of turn-on of the reflective wedge-shaped liquid crystal cell of the invention.

As shown in FIG. 5A, the reflective wedge-shaped liquid crystal cell 6 is turned on, incident light is vertical, and emergent light angle $\theta_{out} = -2\Delta n\omega$.

Figure 5B:
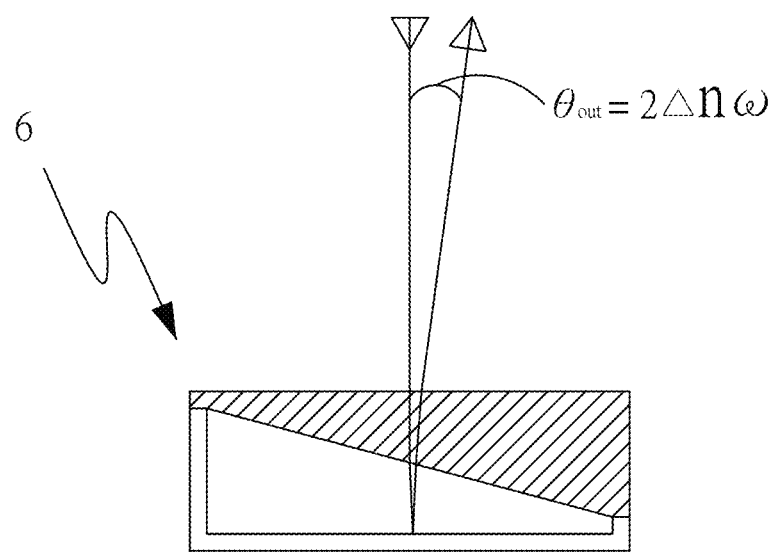
FIG. 5B is the second schematic diagram of implementation of turn-on of the reflective wedge-shaped liquid crystal cell of the invention.

As shown in FIG. 5B, the reflective wedge-shaped liquid crystal cell 6 is turned on, incident light is vertical, and emergent light angle $\theta_{out} = 2\Delta n\omega$.

Wherein it can be known from the above that a conclusion of the reflective wedge-shaped liquid crystal cell 6 for oblique incident light: from the above formulas, it can be derived that when oblique light is incident, we summarize the basic effects produced by it into four types, and assume an angle of the extended slope 21 is $\omega$.

Figure 6A:
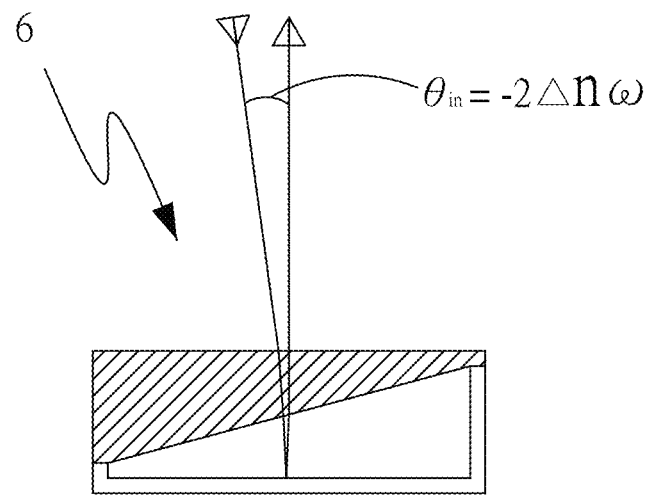
FIG. 6A is a third schematic diagram of implementation of turn-on of the reflective wedge-shaped liquid crystal cell of the invention.

As shown in FIG. 6A, the reflective wedge-shaped liquid crystal cell 6 is turned on, incident angle $\theta_{in} = -2\Delta n\omega$, reflected light is vertical.

Figure 6B:
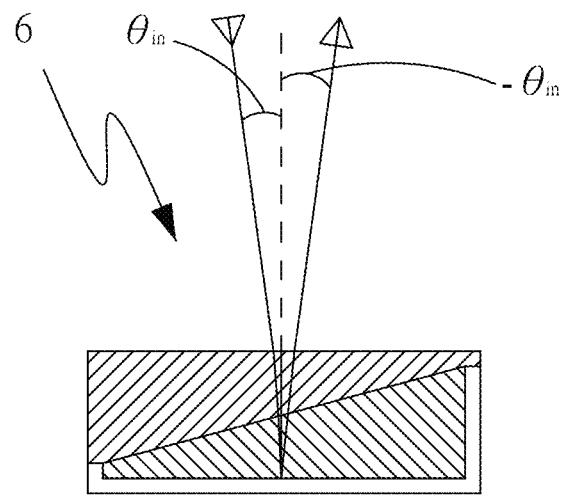
FIG. 6B is a fourth schematic diagram of implementation of turn-on of the reflective wedge-shaped liquid crystal cell of the invention.

As shown in FIG. 6B, the reflective wedge-shaped liquid crystal cell 6 is turned off, incident angle $\theta_{in}$, reflected light is $\theta_{in}$.

As shown in FIG. 6C, the reflective wedge-shaped liquid crystal cell 6 is turned on, incident angle $\theta_{in} = -\Delta n\omega$, reflected light is $-\Delta n\omega$, wherein when the reflective wedge-shaped liquid crystal cell 6 is turned on, its effect is equivalent to a reflector with a deflection angle of $\Delta n\omega$, as shown in FIG. 6D.

As shown in FIG. 6E, the transmissive wedge-shaped liquid crystal cell 5 is turned on, incident angle $\theta_{in}$, transmitted light is $\theta_{in} + \Delta n\omega$.

Figure 7A:
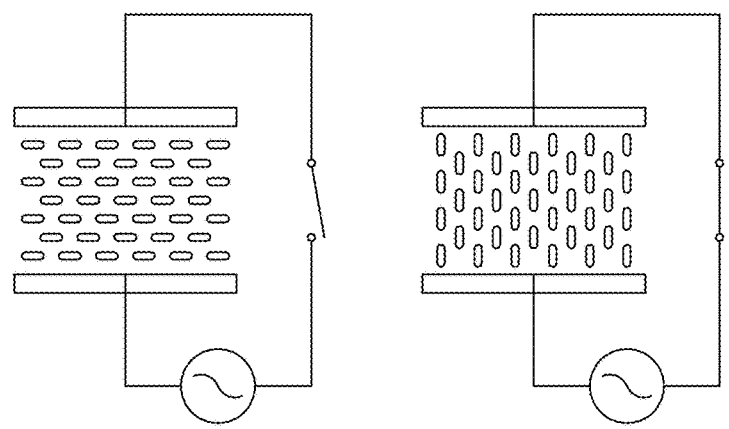
FIG. 7A is a diagram showing arrangement of liquid crystal molecules of the invention with and without applying an electric field.
Figure 7B:
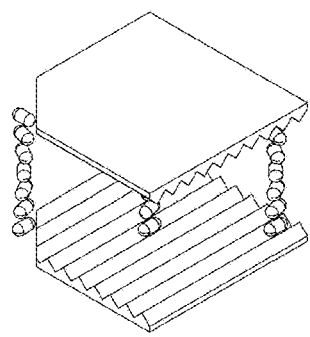
FIG. 7B is a diagram showing arrangement of liquid crystal molecules of a conventional liquid crystal panel.
Figure 7D:
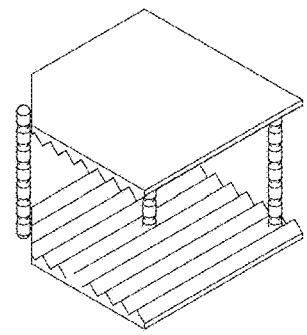
FIG. 7D is a diagram showing arrangement of liquid crystal molecules of the invention with applying an electric field.
Figure 7C:
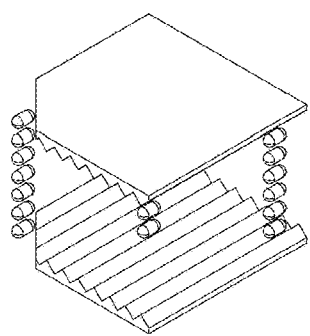
FIG. 7C is a diagram showing arrangement of liquid crystal molecules of the invention without applying an electric field.

For non-polarized designs, general light waves are composed of two polarized lights, P light and S light. The conventional alignment films of P light and S light are perpendicular to each other. Conventionally, a polarizer is added to a liquid crystal cell to enable the P light to pass through and filter out the S light, and liquid crystals change a phase to produce a grayscale effect. For example, FIG. 7A is a two-dimensional view of liquid crystal state of a conventional alignment film without and with applying an electric field, while FIG. 7B is a three-dimensional view of liquid crystal state of a conventional alignment film without applying an electric field. The invention hopes to arrange an alignment film of a liquid crystal cell structurally as shown in FIG. 7C and FIG. 7D. FIG. 7C is a diagram showing liquid crystal state of liquid crystals of the invention without applying an electric field, and FIG. 7D is a diagram showing liquid crystal state of liquid crystals of the invention with applying an electric field.

Figure 8A:
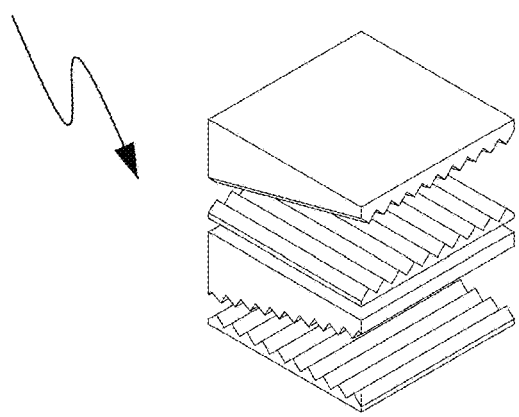
FIG. 8A is a structural diagram of alignment films of the wedge-shaped liquid crystal cells of the invention that are turned on for P light and S light respectively.
Figure 8B:
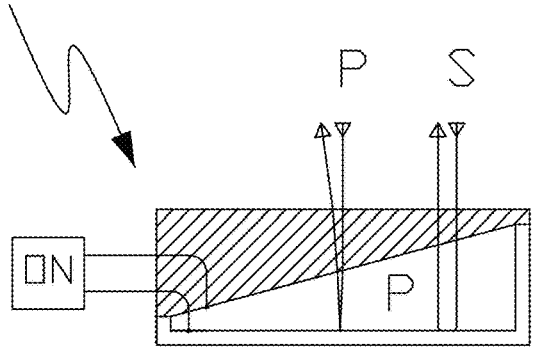
FIG. 8B shows a reflected light of P light and S light incident on the wedge-shaped liquid crystal cell of the invention that is turned on for P light.
Figure 8C:
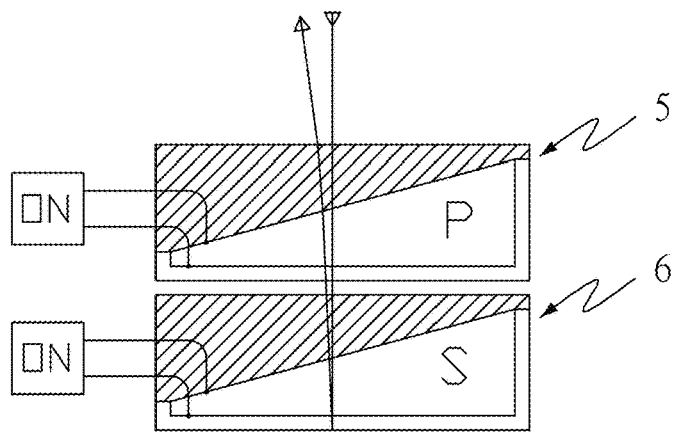
FIG. 8C shows a reflected light of P light and S light incident on the wedge-shaped liquid crystal cells of the invention that are turned on for P light and S light respectively.

As mentioned earlier, the alignment film has only one parallel P direction, so only half of the light can be deflected and reflected. Therefore, the two wedge-shaped liquid crystal cells are stacked and their alignment film directions are perpendicular to each other; all of the light can be deflected and reflected; wherein FIG. 8A is a structural diagram of the stacked liquid crystal cells with directions of two sets of the alignment films perpendicular to each other, one corresponding to P light, one corresponding to S light; FIG. 8B is a response diagram of the single aligned reflective wedge-shaped liquid crystal cell 6 corresponding to incident P light plus S light. Wherein the liquid crystal cell corresponding to the P light is turned on, and light is deflected, corresponding to the S light, and light is not deflected; FIG. 8C is a response diagram of the two overlapping and vertically aligned transmissive wedge-shaped liquid crystal cell 5 and reflective wedge-shaped liquid crystal cell 6 corresponding to the incident P light plus S light. One of the liquid crystal cells corresponding to the P light is turned on and light is deflected, and the other liquid crystal cell corresponding to the S light is turned on and light is deflected, so all the PS light is deflected.

Wherein when it comes to the use of the wedge-shaped liquid crystal cells, the transmissive wedge-shaped liquid crystal cell 5 and the reflective wedge-shaped liquid crystal cell 6 can be used in several ways. The following methods only consider one alignment; if no polarization is required, the two liquid crystal cells with alignments perpendicular to each other are overlapped.

Figure 9A:
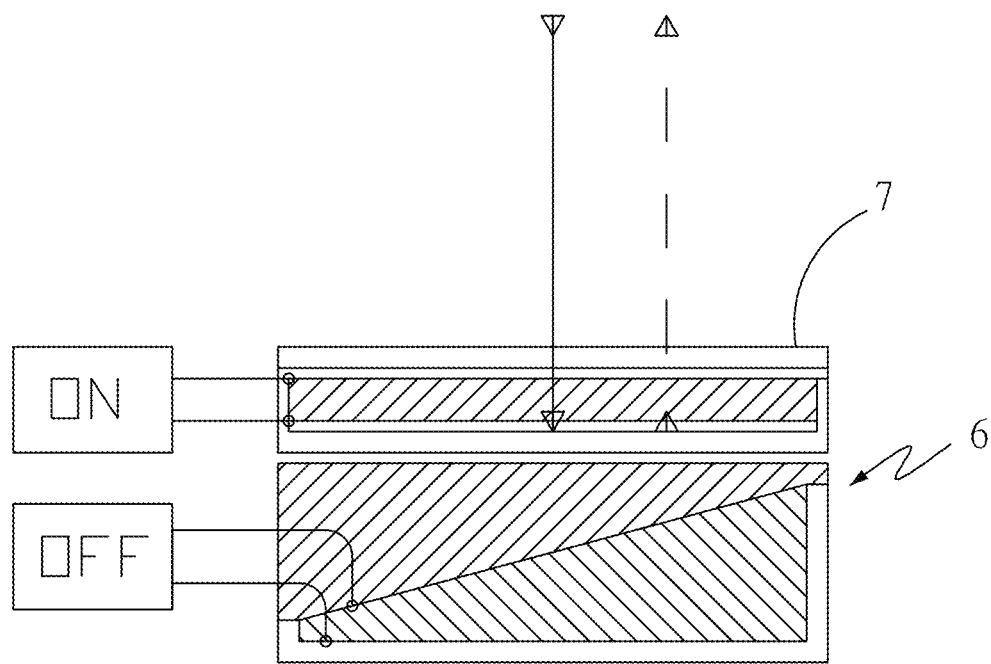
FIG. 9A is a first schematic diagram of implementation of setting up an electrically controlled phase liquid crystal cell of the invention.
Figure 9B:
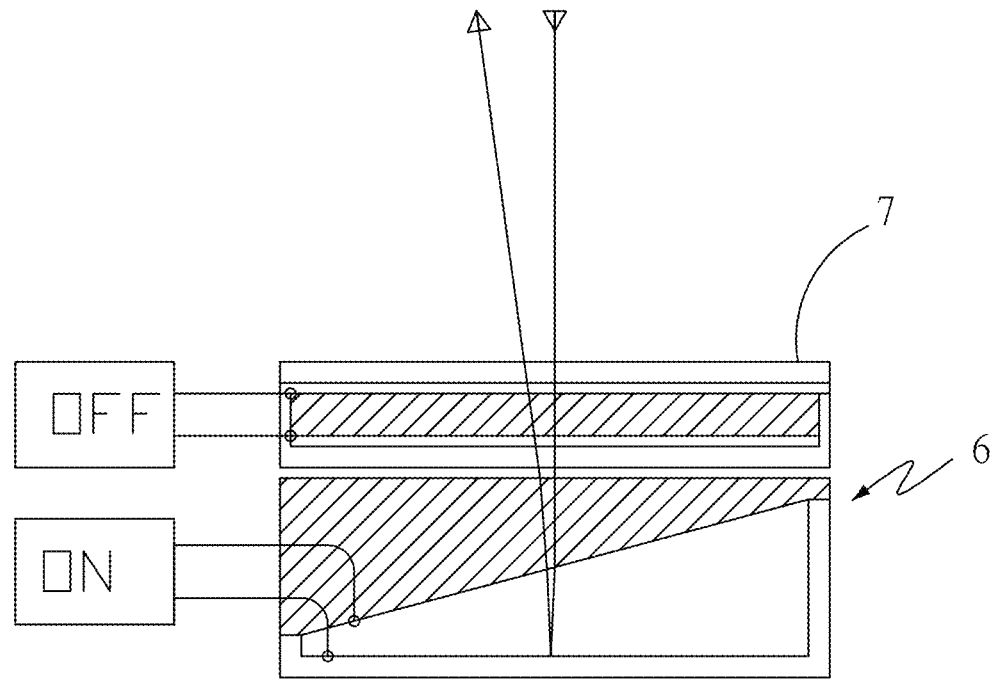
FIG. 9B is a second schematic diagram of implementation of setting up the electrically controlled phase liquid crystal cell of the invention.

A first setting method is shown in FIG. 9A. For vertical incident light, an electrically controlled phase liquid crystal cell 7 is disposed on the reflective wedge-shaped liquid crystal cell 6 or the transmissive wedge-shaped liquid crystal cell 5. Turn-on and turn-off of the electrically controlled phase liquid crystal cell 7 control the entry of light of different phases so that a reflected light becomes a light with a same phase as the wedge-shaped liquid crystal cell. Specifically, when the electrically controlled phase liquid crystal cell 7 is turned on, a light of a same phase as the electrically controlled phase liquid crystal cell 7 can be blocked from entering the wedge-shaped liquid crystal cell. For example, when the electrically controlled phase liquid crystal cell 7 of P phase is turned on, P-polarized light can be blocked from entering the wedge-shaped liquid crystal cell, and conversely when the electrically controlled phase liquid crystal cell 7 is turned off. As shown in FIG. 9A, when the P-phase electrically controlled phase liquid crystal cell 7 is turned on, P-polarized light can be blocked from entering the wedge-shaped liquid crystal cell. As shown in FIG. 9B, when the P-phase electrically controlled phase liquid crystal cell 7 is turned off, P-polarized light enters the liquid crystal cell. At this time, if the wedge-shaped liquid crystal cell is turned on at the same time, reflected light will be deflected to the left.

Figure 9C:
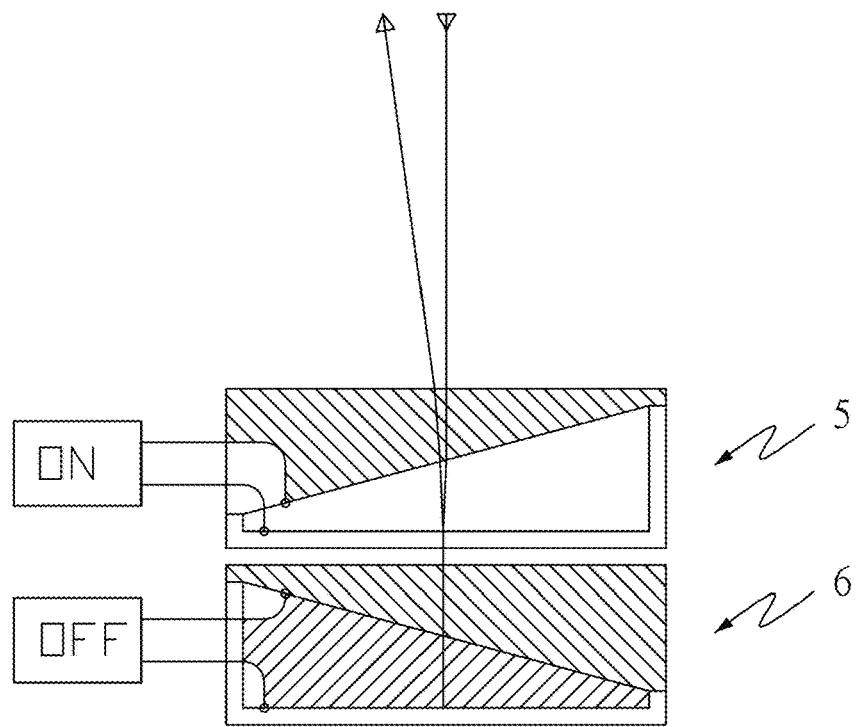
FIG. 9C is a first schematic diagram of implementation of electrically controlling a deflection angle of light of the invention.
Figure 9D:
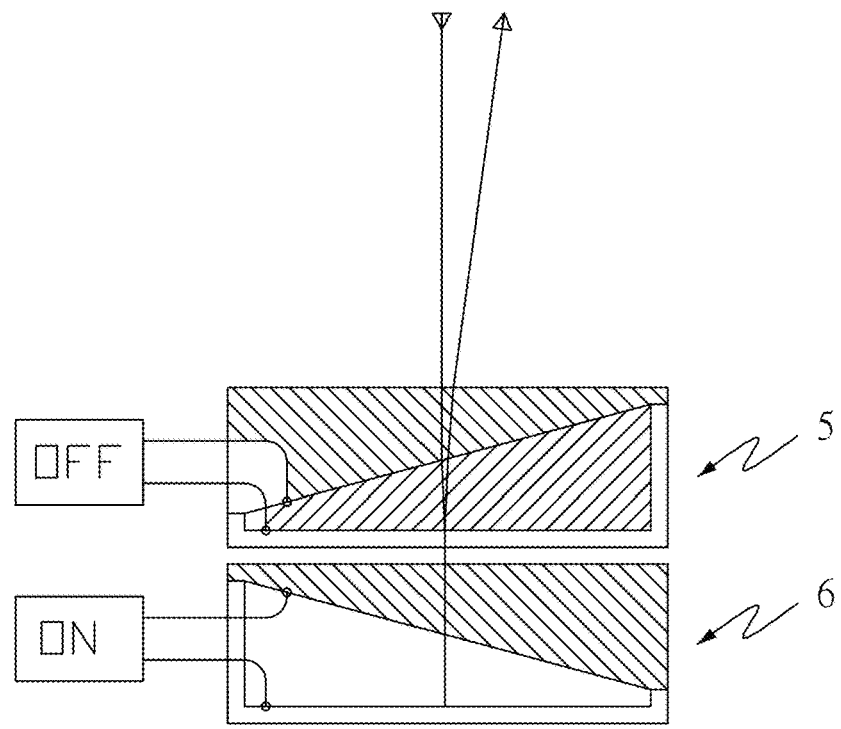
FIG. 9D is a second schematic diagram of implementation of electrically controlling a deflection angle of light of the invention.

A second setting method is to stack the transmissive wedge-shaped liquid crystal cell 5 on the reflective wedge-shaped liquid crystal cell 6, and a deflection angle of light is controlled through two electronic controls. As shown in FIG. 9C, when the transmissive wedge-shaped liquid crystal cell 5 is turned on and the reflective wedge-shaped liquid crystal cell 6 is turned off, reflected light will be deflected to the left; or as shown in FIG. 9D, when the transmissive wedge-shaped liquid crystal cell 5 is turned off and the reflective wedge-shaped liquid crystal cell 6 is turned on, reflected light will be deflected to the right.

Figure 10A:
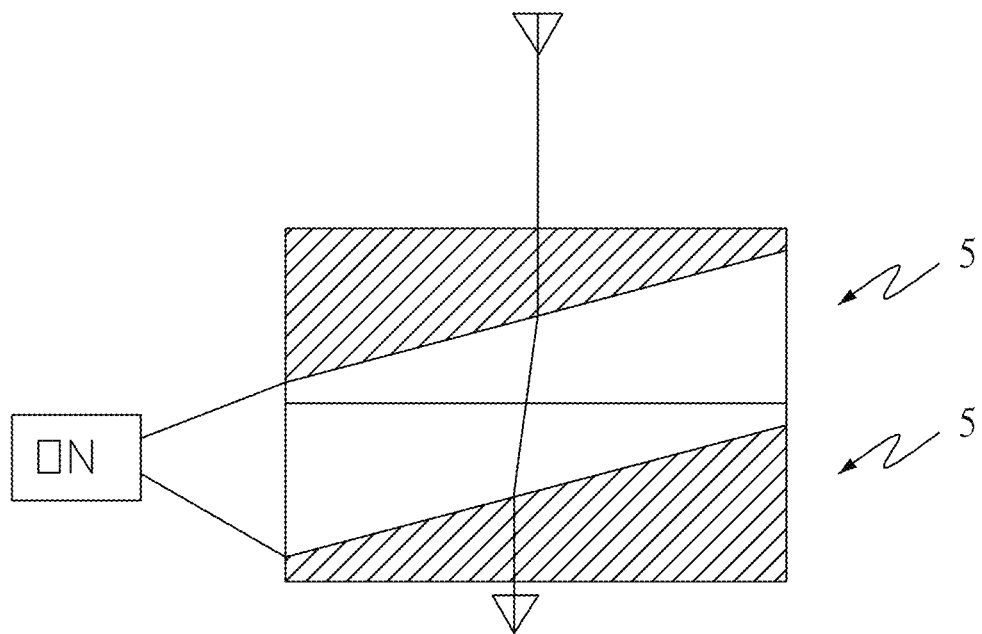
FIG. 10A is a schematic diagram of implementation of the transmissive wedge-shaped liquid crystal cell of the invention with deflection of incident light.
Figure 10B:
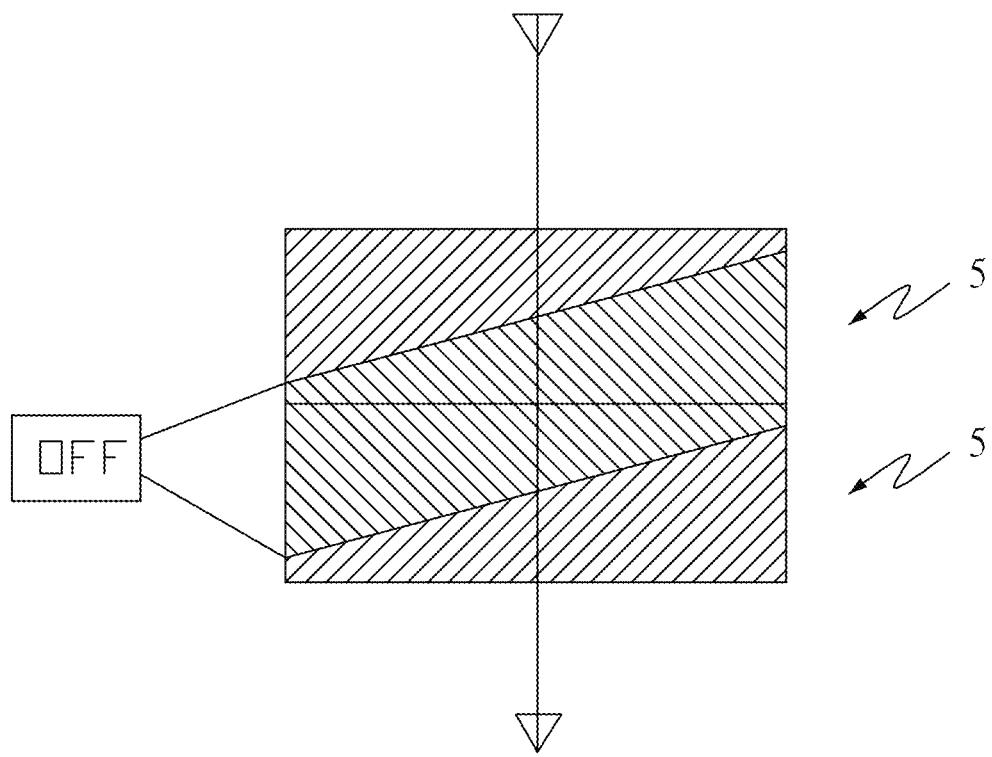
FIG. 10B is a schematic diagram of implementation of the transmissive wedge-shaped liquid crystal cell of the invention without deflection of incident light.

For the pixel displacement effect, two sets of the transmissive wedge-shaped liquid crystal cells 5 are stacked, the base glass 2 of the upper transmissive wedge-shaped liquid crystal cell 5 is joined to the base glass 2 of the lower transmissive wedge-shaped liquid crystal cell 5, that is, the upper transmissive wedge-shaped liquid crystal cell 5 and the lower transmissive wedge-shaped liquid crystal cell 5 are combined by rotating 180 degrees. This embodiment can make bottom glasses of the two liquid crystal cells very thin, and a direction of the extended slope 21 of the upper transmissive wedge-shaped liquid crystal cell 5 and a direction of the extended slope 21 of the lower transmissive wedge-shaped liquid crystal cell 5 are the same to form a pixel displacement wedge-shaped liquid crystal cell module 8, and a light emission position of a transmitted light is controlled by conductive configurations of the first transparent conductive film 22 and the second transparent conductive film 42 of each of the transmissive wedge-shaped liquid crystal cells 5. As shown in FIG. 10A, an effect of incident light shifting position can be created: when the liquid crystal cell is turned on, incident light deflects; when the liquid crystal cell is turned off, incident light does not deflect. As shown in FIG. 10B, the effect is equivalent to a rotating glass sheet. A result of deflection of incident light can be applied to the pixel displacement technology algorithm of digital cameras and to projectors to increase a resolution (such as TI's XPR technology algorithm).

Figure 11:
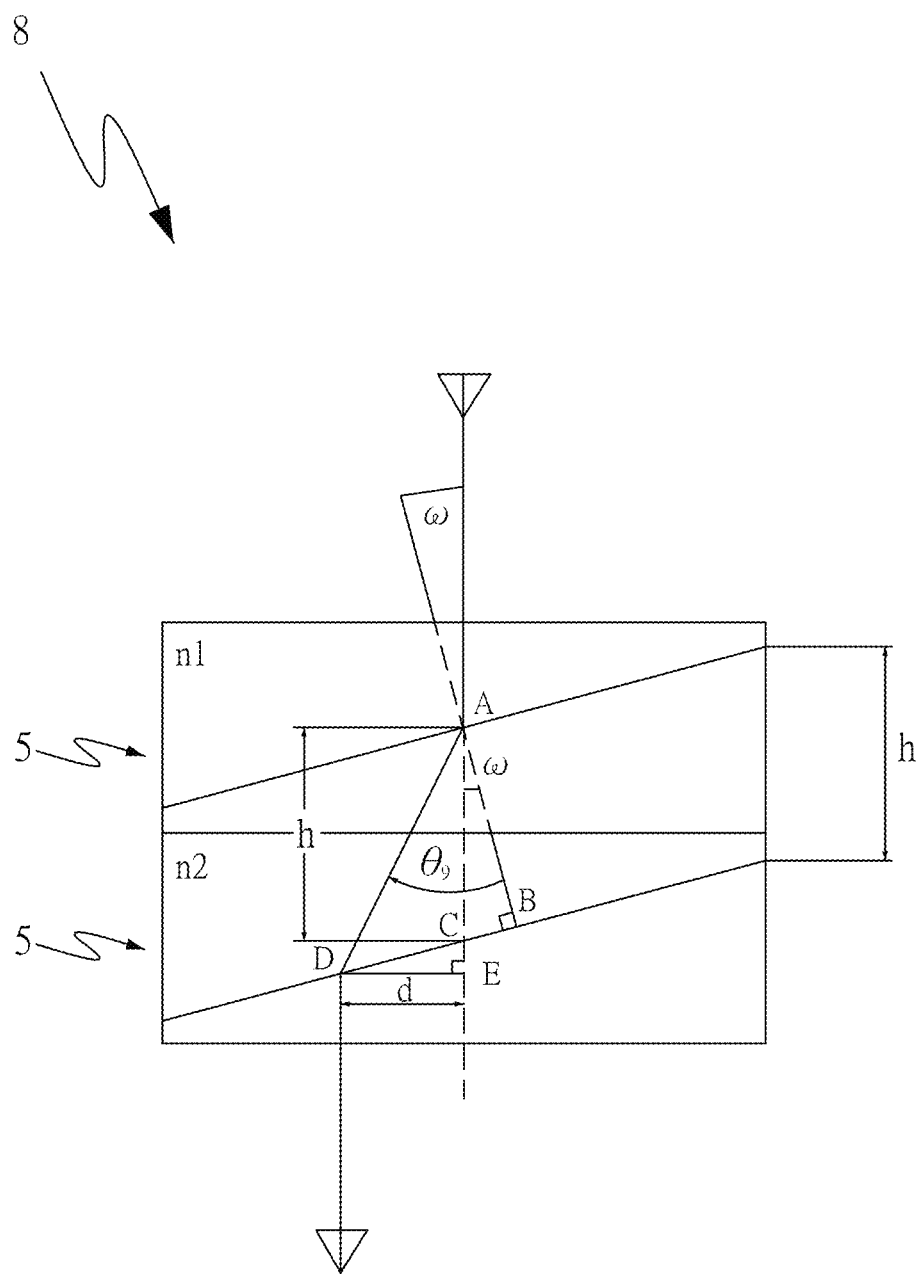
FIG. 11 is a second schematic diagram of implementation of the transmissive wedge-shaped liquid crystal cell of the invention.

In addition, derivation of a pixel displacement effect formula is explained as follows. As shown in FIG. 11, the pixel displacement effect formula is derived, wherein incident light is vertically incident on the liquid crystal cell; a deflection amount d of a light ray position is derived:

point A: refraction point at junction where incident light passes through the upper cover glass of the upper liquid crystal cell and the liquid crystal layer point B: refraction point at junction where incident light passes through the liquid crystal layer of the lower liquid crystal cell and a lower cover glass $n_1$: a value of a refractive index of the wedge-shaped upper cover glass is equal to $n_{2e}$ of liquid crystal;

$n_2$: liquid crystal refractive index $n_{2o}$;

$\omega$: angle of the wedge-shaped upper cover glass;

$\theta_9$: included angle between normal line of junction between the wedge-shaped upper cover glass and the liquid crystal layer and refracted light at point A h: thickness of the liquid crystal layer d: deflection amount of light ray position Light is refracted at point A $$n_1\omega = n_2\theta_9 \tag{43}$$

$$\overline{DB} = \overline{AB} \tan\theta_9 \tag{44}$$

$$\overline{AB} = h\cos\omega \tag{45}$$

$$\overline{CB} = \overline{AB} \tan\omega \tag{46}$$

$$\overline{DC} \cos\omega = d \tag{47}$$

$$\overline{DB} = h\cos\omega \tan\theta_9 \tag{48}$$

$$\overline{DB} = \overline{DC} + \overline{CB} \tag{49}$$

$$h\cos\omega\tan\theta_9 = \frac{d}{\cos\omega} + h\cos\omega\tan\omega \tag{50}$$

From formula (44)

$$h\cos^2\omega\tan\theta_9 = d + h\cos^2\omega\tan\omega \tag{52}$$

Assuming $\tan\theta_9 \cong \theta_9$, $\tan\omega \cong \omega$;

$$d = h(1-\omega^2)\left(\frac{n_1}{n_2}-1\right)\omega \tag{53}$$

Wherein an embodiment of unidirectional pixel displacement effect is as follows.

Assuming an angle of the wedge-shaped upper cover glass of the liquid crystal cell is $\omega = 15°$, $n_1 = 1.7859$, a liquid crystal material uses Merck's E44 liquid crystal, light is vertically incident on the liquid crystal cell.

$n_{2e} = n_1 = 1.7859$  $n_{2o} = n_2 = 1.5278$  $h = 10$ mm

According to formula (53);

d=0.414 (mm) This is a very small amount of displacement, and it is relatively difficult for conventional machinery to achieve this kind of displacement.

Figure 13A:
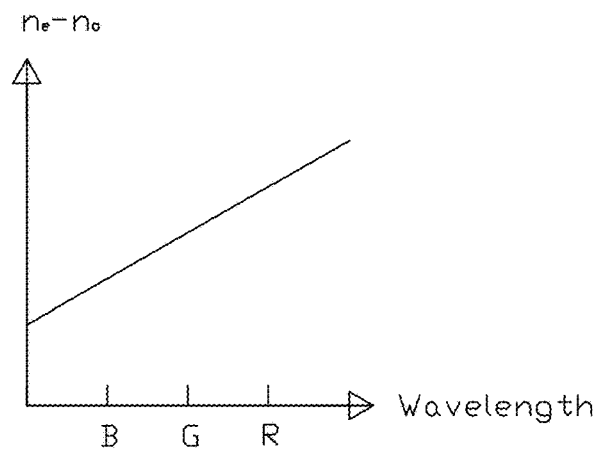
FIG. 13A is a plot of $n_e - n_o$, values of a liquid crystal material versus light wavelength.
Figure 13B:
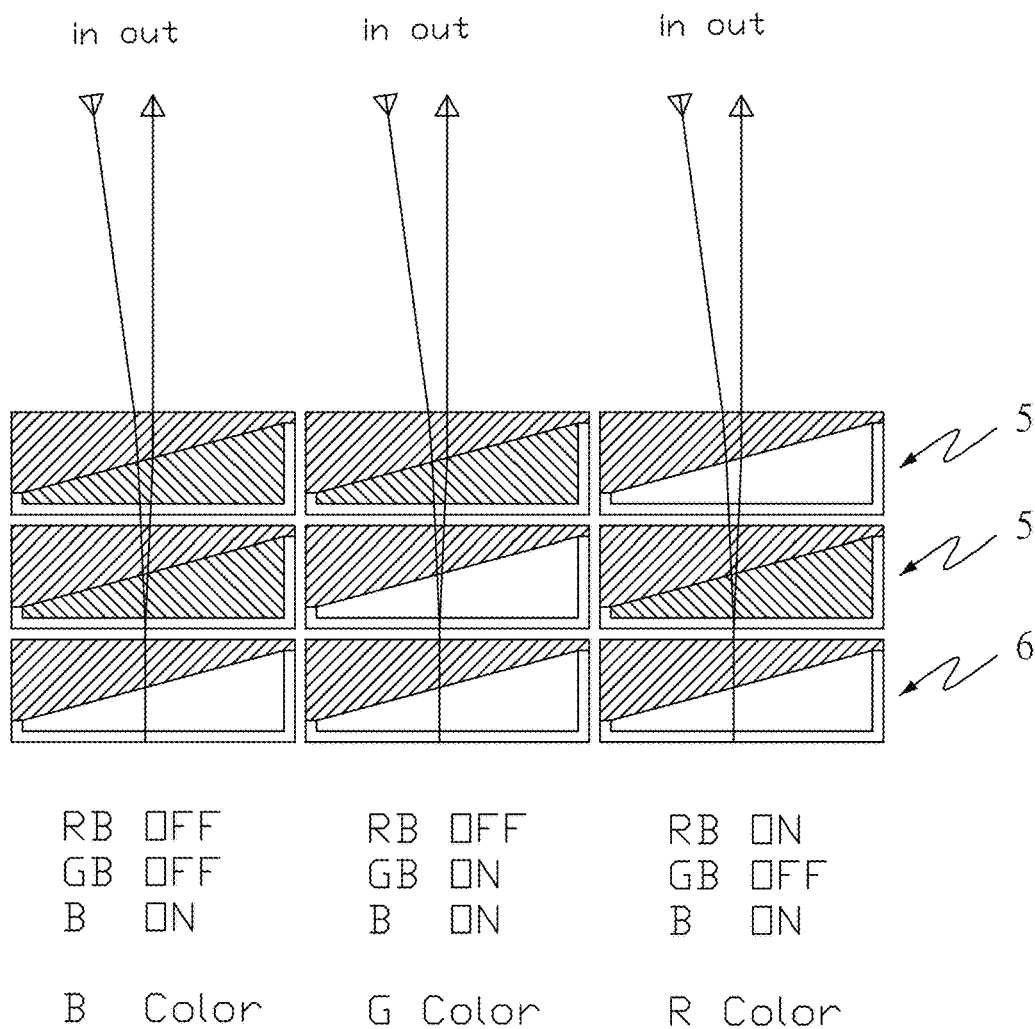
FIG. 13B is a schematic diagram of implementation of stacking the wedge-shaped liquid crystal cells of the invention in three layers to correct a reflection angle of colored light.
Figure 13C:
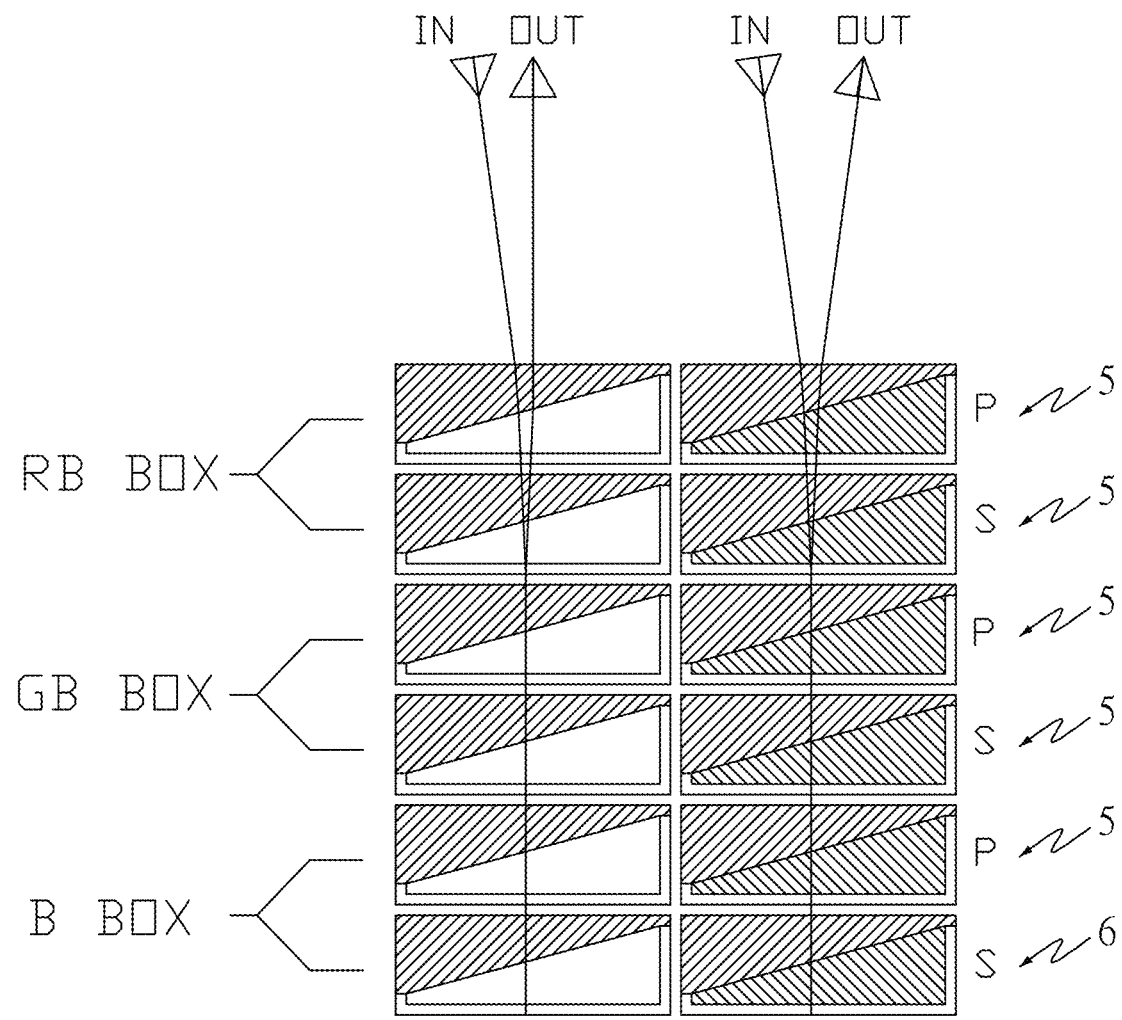
FIG. 13C is a schematic diagram of implementation of stacking the wedge-shaped liquid crystal cells of the invention in six layers to correct a reflection angle of colored light.

In addition, as shown in FIG. 12A, it is an embodiment of the vector pixel displacement effect. The transmissive wedge-shaped liquid crystal cell 5 and the other transmissive wedge-shaped liquid crystal cell 5 are combined by rotating 180 degrees as a set to form the pixel displacement wedge-shaped liquid crystal cell module 8; the other set of the pixel displacement wedge-shaped liquid crystal cell module 8 is rotated 90 degrees and combined together; which can be made into a vector pixel displacement device; the liquid crystal cells 5 of the upper set of the pixel displacement wedge-shaped liquid crystal cell module 8 are turned on, and shifted in the X-axis direction, as shown in FIG. 12B; the liquid crystal cells 5 of the lower set of the pixel displacement wedge-shaped liquid crystal cell module 8 are turned on, and shifted in the Y-axis direction, as shown in FIG. 12C; the liquid crystal cells 5 of the upper and lower sets of the pixel displacement wedge-shaped liquid crystal cell modules 8 are turned on, and shifted in the 45-degree direction (XY direction), as shown in FIG. 12D.

Wherein differential compensation of deflection angles of light of different colors in some cases are explained as follows. Mainly because a liquid crystal material inherently has large dispersion characteristics, different $\Delta n$ values $(n_e - n_o)$ are presented corresponding to different colors of light (B-blue light, G-green light, R-red light), as shown in FIG. 13A. Therefore, it can be known from the formula $\theta_{out} = 2\Delta n \omega$ that in order to obtain a same deflection angle value for each color of light, a liquid crystal wedge-shaped angle $\omega$ corresponding to each color of light needs to have a different value. In order to obtain a same deflection angle value for each color of light, the three wedge-shaped liquid crystal cells are stacked and control is achieved by switching the liquid crystal cells on and off so that each color of light can obtain a corresponding compensation angle. Generally speaking, $\omega$ corresponding to blue light (B) is the smallest, the liquid crystal cell corresponding to blue light (B) is disposed in a bottom layer, a corresponding liquid crystal layer angle is $\omega B$. $\omega$ corresponding to green light (G) is larger, the liquid crystal cell of green light angle compensation corresponding to blue light (B) is disposed in a middle layer, a corresponding liquid crystal layer angle is $\omega_{G-B}$. $\omega$ corresponding to red light (R) is the largest, the liquid crystal cell corresponding to red light (R) is disposed in an upper layer, a corresponding liquid crystal layer angle is $\omega_{G-B}$. We can get: blue light angle $\omega_B$, green light angle $\theta_G = \omega_{G-B} + \omega_B$, red light angle $\omega_R = \omega_{RB} + \omega_B$, as shown in FIG. 13B, wherein two sets of the transmissive wedge-shaped liquid crystal cells 5 stacked on each other are stacked on the reflective wedge-shaped liquid crystal cell 6, the included angle $\omega_B$ is formed between the extended slope 21 of the reflective wedge-shaped liquid crystal cell 6 and the horizontal axis of the starting point of the extended slope 21; the included angle $\omega_{G-B}$ is formed between the extended slope 21 of the lower transmissive wedge-shaped liquid crystal cell 5 and the horizontal axis of the starting point of the extended slope 21; the included angle $\omega_{R-B}$ is formed between the extended slope 21 of the upper transmissive wedge-shaped liquid crystal cell 5 and the horizontal axis of the starting point of the extended slope 21. When processing blue light angle compensation, the first transparent conductive film 22 and the second transparent conductive film 42 of the reflective wedge-shaped liquid crystal cell 6 do not conduct electricity. But when the first transparent conductive films 22 and the second transparent conductive films 42 of the two sets of the transmission wedge-shaped liquid crystal cells 5 conduct electricity, and when processing green light angle compensation, the first transparent conductive film 22 and the second transparent conductive film 42 of the reflective wedge-shaped liquid crystal cell 6 do not conduct electricity; the first transparent conductive film 22 and the second transparent conductive film 42 of the lower transmissive wedge-shaped liquid crystal cell 5 do not conduct electricity; the first transparent conductive film 22 and the second transparent conductive film 42 of the upper transmissive wedge-shaped liquid crystal cell 5 conduct electricity. When processing the red light angle compensation, the first transparent conductive film 22 and the second transparent conductive film 42 of the reflective wedge-shaped liquid crystal cell 6 do not conduct electricity; the first transparent conductive film 22 and the second transparent conductive film 42 of the upper transmissive wedge-shaped liquid crystal cell 5 do not conduct electricity; the first transparent conductive film 22 and the second transparent conductive film 42 of the lower transmissive wedge-shaped liquid crystal cell 5 conduct electricity. In addition, if the case of non-polarized light is considered, six layers of the liquid crystal cells need to be stacked. Because corresponding to different liquid crystal wedge-shaped angles $\omega_B$、$\omega_{G-B}$、$\omega_{R-B}$, each requires two layers of the liquid crystal cells for processing P light and S light respectively, as shown in FIG. 13C. An operation mode is to turn on the liquid crystal cells with a same liquid crystal wedge-shaped angle at the same time. For example, if reflected blue light needs to be processed, the liquid crystal cells that process P light and S light respectively and have a liquid crystal wedge-shaped angle of $\omega_B$ are turned on at the same time.

Wherein for the design embodiments of the liquid crystal cells with different colors of light, the E44 liquid crystal material produced by Merck is taken as an example;

C spectral line red light: $n_o\_R=1.5223$, $n_e\_R=1.7709$, $\Delta n\_R=0.2486$.

d spectral line green light: $n_o\_R=1.5223$, $n_e\_R=1.7709$, $\Delta n\_R=0.2486$.

F spectral line blue light: $n_o\_B=1.5409$, $n_e\_B=1.8278$ $\Delta n\_B=0.2869$;

blue light angle $\omega_B=13.942°$, green light compensation angle $\omega_{G-B}=15.49°-13.942°=1.548°$.

red light compensation angle $\omega_{R-B}=16.09-13.942°=2.148°$.

Figure 14A:
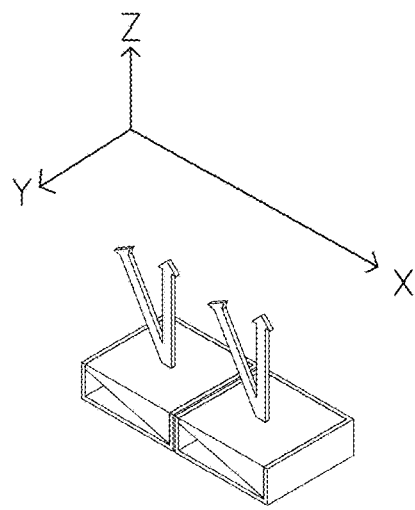
FIG. 14A is a schematic diagram showing relative arrangement of the liquid crystal cells of the invention that reflect light along the X direction one-dimensionally.
Figure 14A:
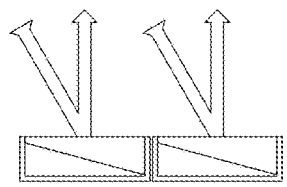
Figure 14B:
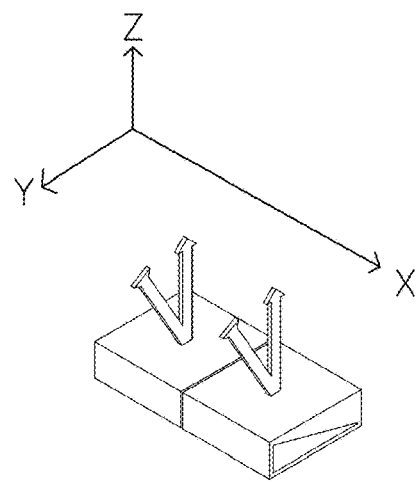
FIG. 14B is a schematic diagram showing relative arrangement of the liquid crystal cells of the invention that reflect light along the Y direction one-dimensionally.
Figure 14B:
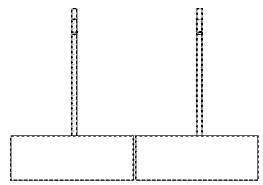
Figure 14C:
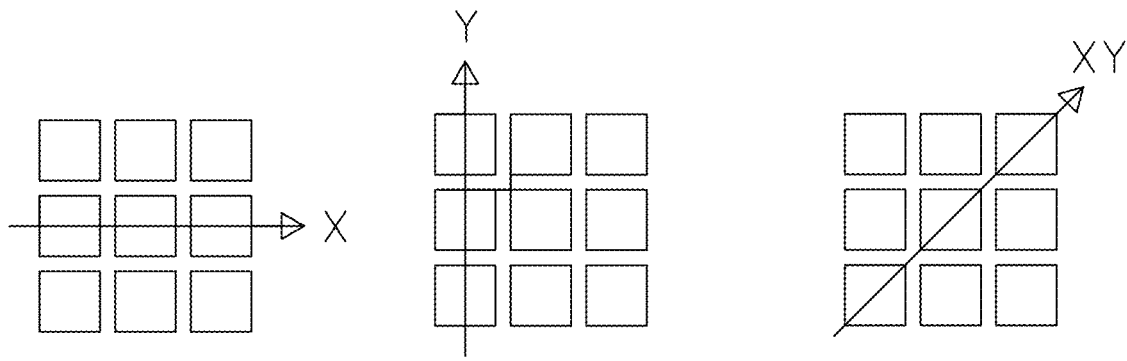
FIG. 14C is a schematic diagram showing relative arrangement of the liquid crystal cells of the invention that reflect light in various directions two-dimensionally.
Figure 14D:
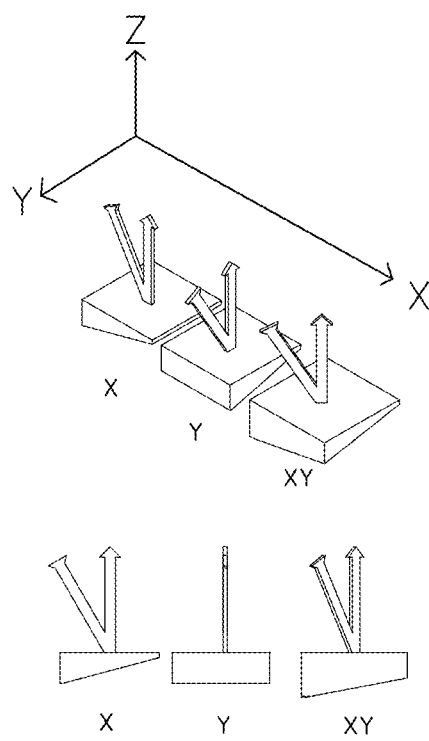
FIG. 14D is a schematic diagram showing direction comparison between the liquid crystal cells of the invention that reflect light in various directions two-dimensionally and a wedge-shaped glass.
Figure 15A:
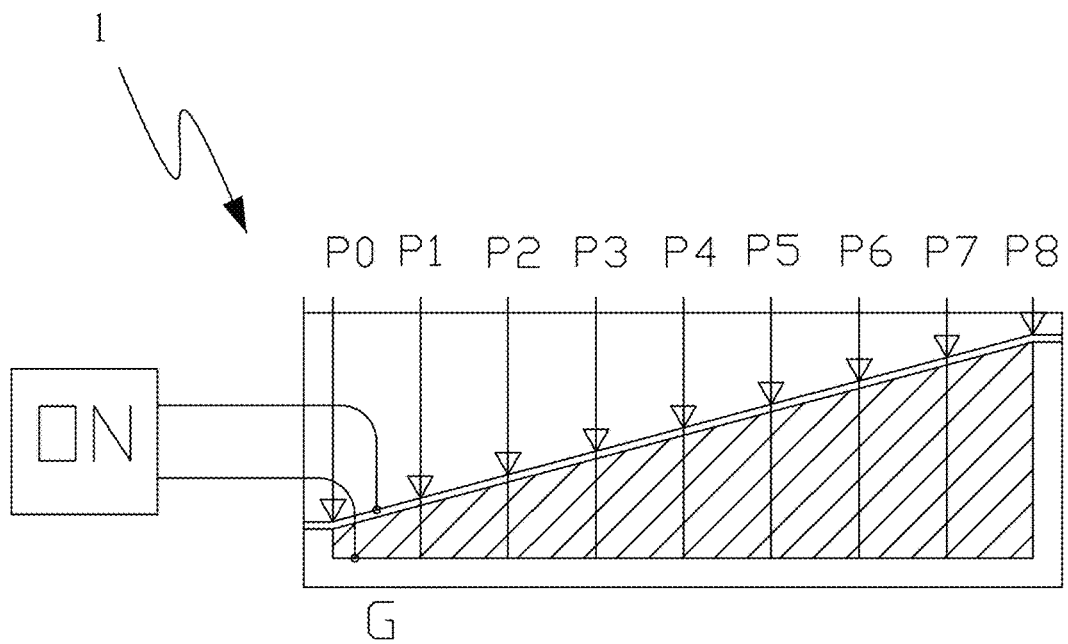
FIG. 15A is a first schematic diagram of voltages provided by the wedge-shaped liquid crystal cell of the invention.
Figure 15B:
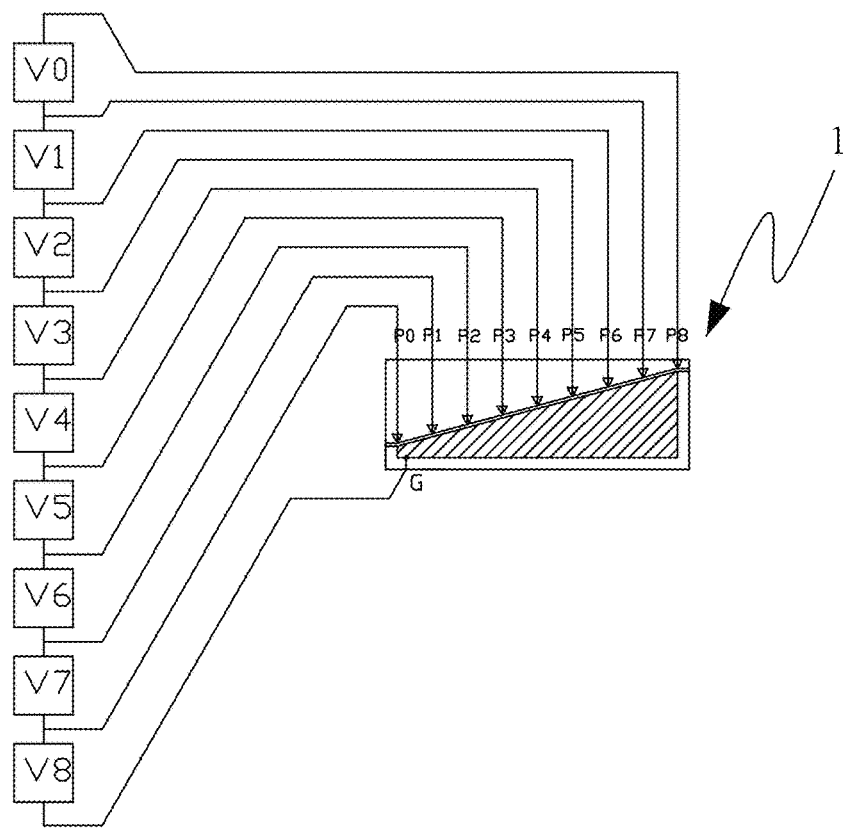
FIG. 15B is a second schematic diagram of voltages provided by the wedge-shaped liquid crystal cell of the invention.

Wherein, for arrayed wedge-shaped liquid crystal cells and their arrangement directions, more applications can be provided after the wedge-shaped liquid crystal cells are miniaturized and arrayed. As shown in FIGS. 14A and 14B, a one-dimensionally arranged wedge-shaped liquid crystal cells array has different combinations depending on a direction of the extended slope at a bottom of the wedge-shaped upper cover glass. FIG. 14A shows the extended slopes of the liquid crystal cells in the wedge-shaped liquid crystal cells array facing the X-axis direction. FIG. 14B shows the extended slopes of the liquid crystal cells in the wedge-shaped liquid crystal cells array facing the Y-axis direction. In addition, a two-dimensionally arranged wedge-shaped liquid crystal cells array also has different combinations depending on a direction of the extended slope at a bottom of the wedge-shaped upper cover glass. The wedge-shaped liquid crystal cells array can be disposed in three directions: X-axis, Y-axis, and XY-axis. In FIG. 14C, three-dimensional perspectives of light deflection and an axis direction defined by the array are shown. As shown in FIG. 14D, according to mechanism designs of different devices (such as projectors, scanners, etc.), different arrangement modes adopted make the applications of the invention more diverse.

Wherein multi-layer electrodes of the wedge-shaped liquid crystal cell are explained as follows. Since the transition of liquid crystal state is related to electric field, a state of the wedge-shaped liquid crystal cell is as shown in FIG. 15A. According to the formula $$E = \frac{V}{d},$$

a voltage V is applied to liquid crystal, and d (liquid crystal thickness) of P0~P8 is uneven, which causes the problem of uneven electric field on the wedge-shaped liquid crystal cell. Electric fields from point P0 to point P8 are different, this will cause a liquid crystal state to change incompletely, and there is also the problem that it cannot change at the same time. Therefore, for the wedge-shaped liquid crystal cell, different voltages need to be applied to each block P0~P8 so that an electric field at each point is the same. As shown in FIG. 15B, a series-connected multiple electrodes structure is designed. Different voltages are applied to P0~P8. A voltage at point P0 is V8, a voltage at point P1 is V7+V8, a voltage at point P2 is V6+V7+V8, a voltage at point P3 is V5+V6+V7+V8, a voltage at point P4 is V4+V5+V6+V7+V8, and a voltage at point Pn is $$\sum\nolimits_{8}^{8-n} V_n.$$

Figure 15C:
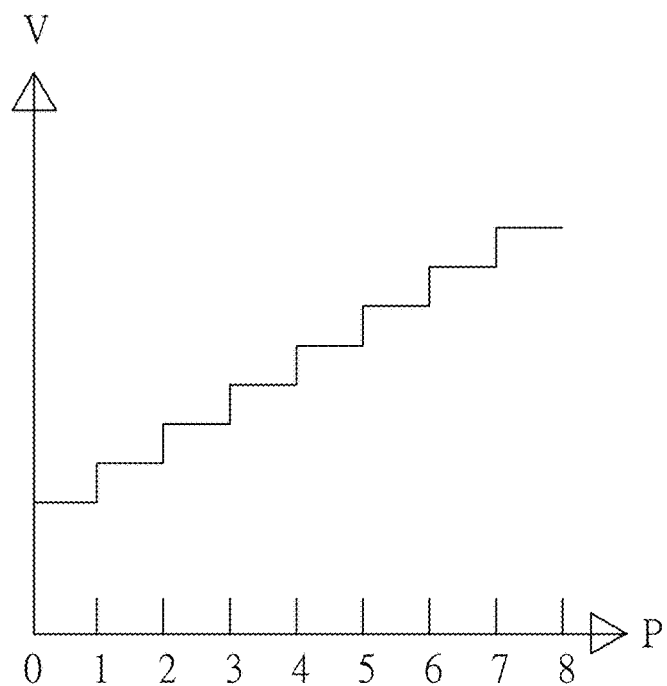
FIG. 15C is a schematic diagram of connection in series linearly to increase voltage progressively at each point of P0~P8.
Figure 15D:
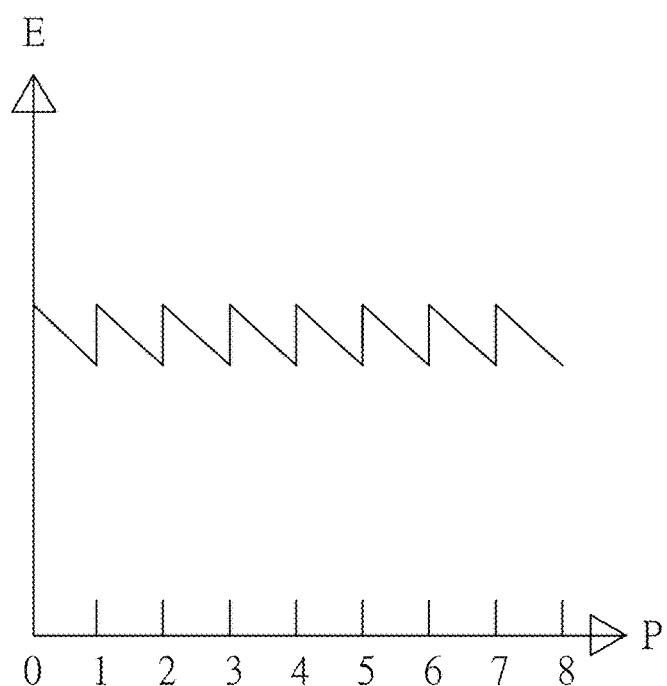
FIG. 15D is a schematic diagram showing that electric field values at each point of P0~P8 are relatively constant values.
Figure 15E:
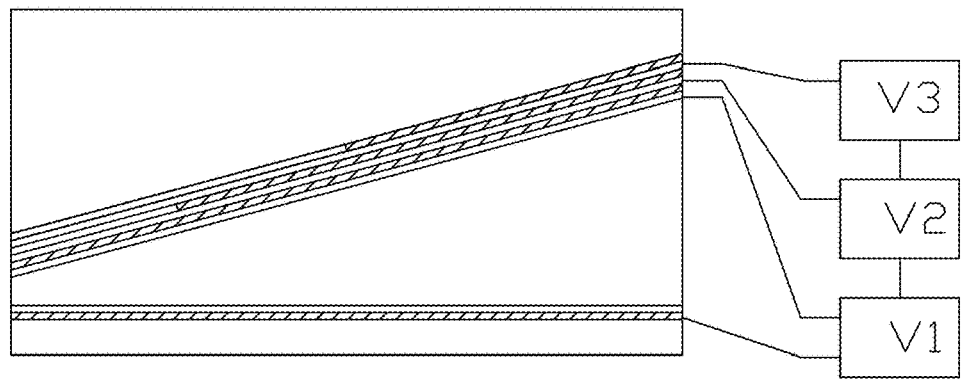
FIG. 15E is a third schematic diagram of voltages provided by the wedge-shaped liquid crystal cell of the invention.
Figure 15F:
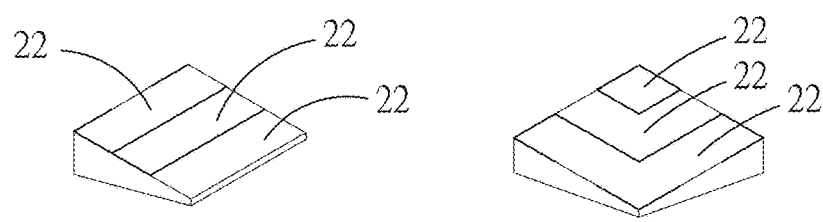
FIG. 15F is a schematic diagram of electrode arrangement of the invention.
Figure 15F:

In addition, in FIG. 15C, an electric field diagram of a single electrode is shown. An electric field is gradually increasing from points 0 to 8. In FIG. 15D, an electric field diagram of multi-layer electrodes is shown. It can be seen that an electric field at points 0 to 8 is relatively uniform. As shown in FIG. 15E, each layer of electrodes is in an independent state, and an electric field caused by each layer of electrodes can be added together. The multi-layer electrodes depend on a direction of a wedge shape, as shown in FIG. 15F.

Figure 16:
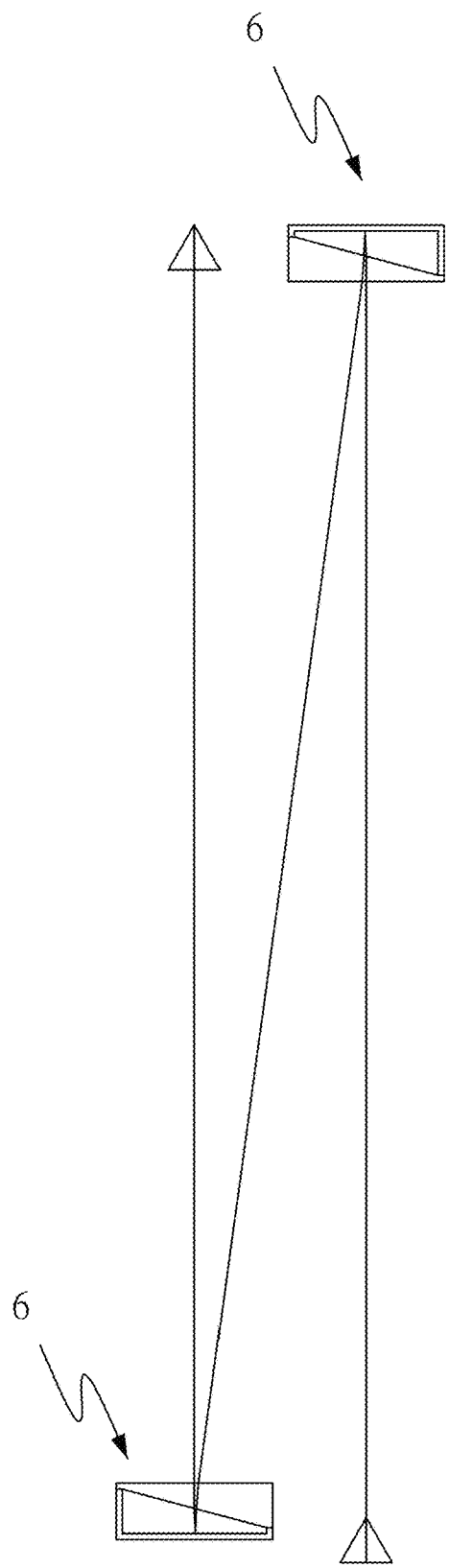
FIG. 16 is a first schematic diagram of implementation of the wedge-shaped liquid crystal cell of the invention.

In addition, applications of the wedge-shaped liquid crystal cell further comprise simplification of light mechanism. As shown in FIG. 16, a light path is made using concepts of the invention, and an angle is corrected by using an electrically controlled switch, such as electrically controlling turn-off of the liquid crystal cell, light beam will return; when the liquid crystal cell is turned on electrically, light beam will deflect. Its calibration is relatively simple, can replace reflectors that require precise fine-tuning, and its precision is sufficient.

Figure 17:
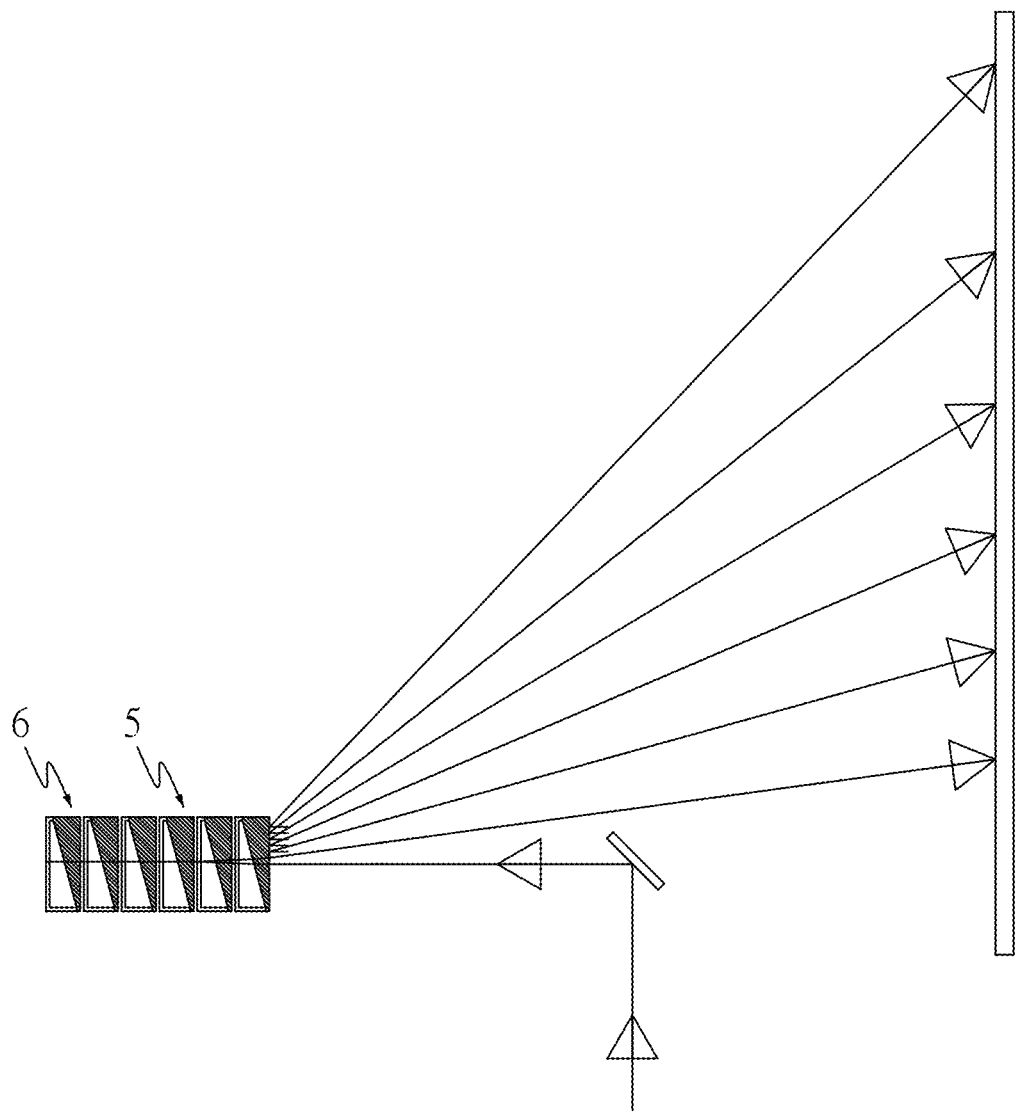
FIG. 17 is a second schematic diagram of implementation of the wedge-shaped liquid crystal cell of the invention.

As shown in FIG. 17, for scanning applications, the wedge-shaped liquid crystal cells stacked in 6 layers are used. By controlling turn-on and turn-off of each of the stacked liquid crystal cells, light can be projected at different angles. The conventional scanning method using rotating polygonal mirrors has the problem of jitter, which can be overcome with this scanning device to achieve better accuracy.

Figure 18:
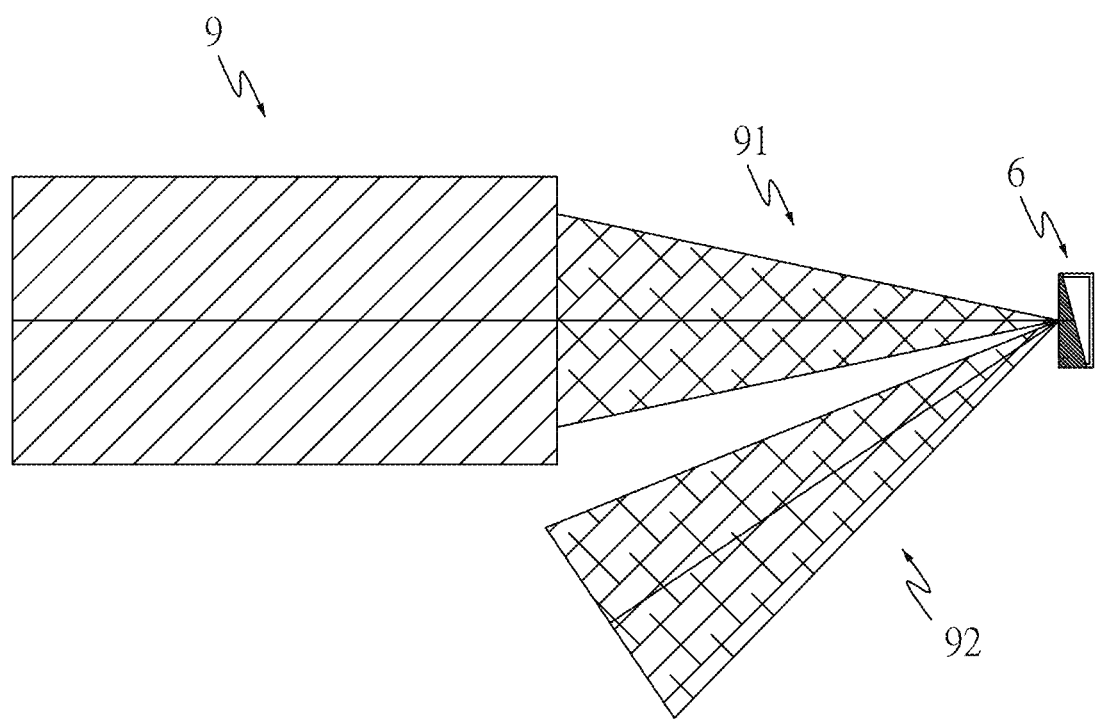
FIG. 18 is a third schematic diagram of implementation of the wedge-shaped liquid crystal cell of the invention.

As shown in projection display in FIG. 18, as mentioned before, by controlling turn-on and turn-off of each of the stacked liquid crystal cells, a DMD-like effect can be obtained, and light reflection path is changed to be applied to projection display devices.

When a projection light source 92 is projected into the reflective wedge-shaped liquid crystal cell 6, a light 91 with a changed angle is generated, which enters a projection lens 9 to produce a projected picture. Because the liquid crystal cell has no moving parts (moving mechanical parts) and only has electrically controlled devices, it is relatively simple in terms of manufacturing technology.

Figure 19:
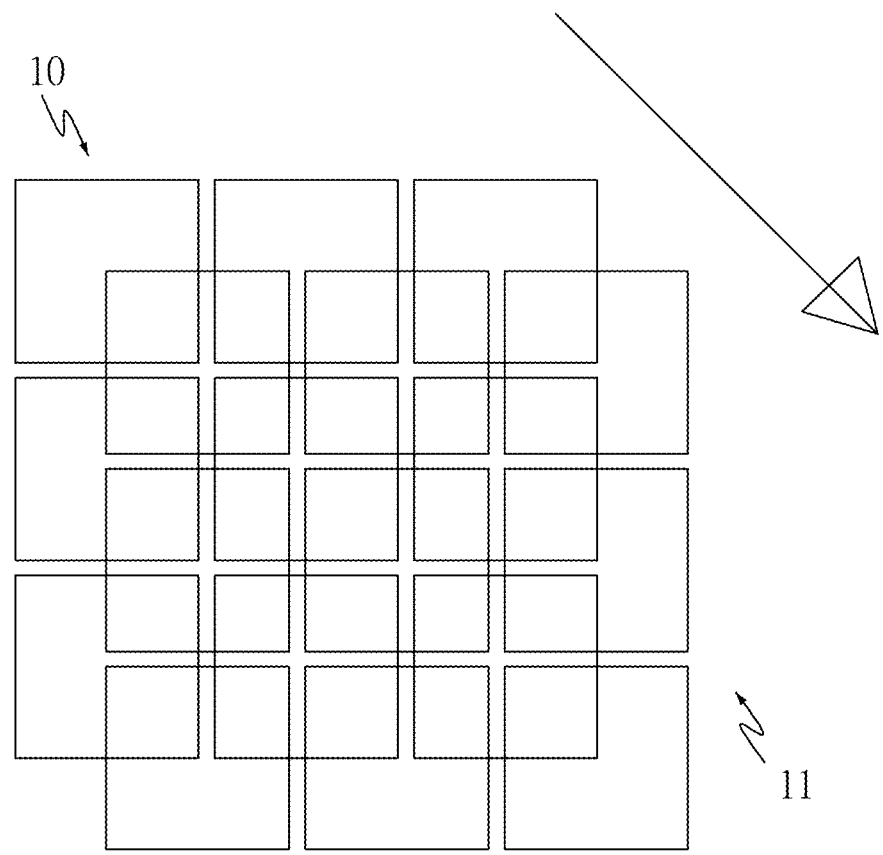
FIG. 19 a schematic diagram showing pixel displacement effect caused by a vector pixel displacement device.

Please refer to FIG. 19 for a vector pixel displacement device, and the previous description of FIGS. 14A and 14B, as well as referring to FIGS. 10A and 10B, an original pixel position 10 is shifted to a position 11 after the pixel displacement device is turned on. The device can be applied to digital cameras and projectors to increase a number of effective pixels and make an image quality more delicate. The invention improves the original method of relying on mechanical vibration, only requiring electrical control to achieve an effect of pixel displacement, which increases reliability and dependability.

The invention has been described in detail above, but the above description merely illustrates the preferred embodiment of the invention, and should not be used to limit a scope implemented by the invention, that is, all equivalent changes and modifications made according to the applied scope of the invention should still fall within the scope covered by the appended claims of the invention.

What is claimed is:

1. A wedge-shaped liquid crystal cell array capable of controlling light angle deflection, comprising:
a wedge-shaped upper cover glass, a bottom of the wedge-shaped upper cover glass being formed with an extended slope, an included angle ω being formed between the extended slope and a horizontal axis of a starting point of the extended slope, a plurality of first transparent conductive films being attached to the extended slope, the first transparent conductive films being disposed in a gradually lengthening manner, a transparent insulating layer being disposed between the adjacent first transparent conductive films, a first alignment film being attached to another side of the first transparent conductive film opposite to the extended slope, a refractive index of the wedge-shaped upper cover glass being $n_1$;
a liquid crystal layer, an upper side of the liquid crystal layer being attached to the first alignment film of the wedge-shaped upper cover glass, a refractive index of the liquid crystal layer being $n_2$; and
a base glass, the base glass and the wedge-shaped upper cover glass forming an accommodating space, the liquid crystal layer being disposed in the accommodating space, at least one second transparent conductive film being attached to a top side of the base glass, a second alignment film being attached to another side of the second transparent conductive film opposite to the base glass, another side of the second alignment film being attached to a bottom surface of the liquid crystal layer to form a transmissive wedge-shaped liquid crystal cell; wherein when the first transparent conductive film and the second transparent conductive film do not conduct electricity, $n_1 > n_2$, when the first transparent conductive film and the second transparent conductive film conduct electricity, $n_1 = n_2$, wherein an emergent light angle of the transmissive wedge-shaped liquid crystal cell is $\theta_{out}$ and an incident light angle of the transmissive wedge-shaped liquid crystal cell is $\theta_{in}$, a limiting condition for the included angle ω formed between the extended slope and the horizontal axis of the starting point of the extended slope is $$|\omega| < \sin^{-1}\left(\frac{1}{n_1}\right),$$

and the emergent light angle is determined according to the following formula: $\theta_{in} + \Delta n \omega$.

2. The wedge-shaped liquid crystal cell array capable of controlling light angle deflection as claimed in claim 1, wherein the transmissive wedge-shaped liquid crystal cells are combined side by side with one another to form an array structure.

3. The wedge-shaped liquid crystal cell array capable of controlling light angle deflection as claimed in claim 2, wherein the transmissive wedge-shaped liquid crystal cells are a one-dimensionally arranged array structure, and the extended slope of each of the wedge-shaped liquid crystal cells is disposed facing toward X-axis direction or Y-axis direction.

4. The wedge-shaped liquid crystal cell array capable of controlling light angle deflection as claimed in claim 3, wherein a stacked array structure of the transmissive wedge-shaped liquid crystal cells of the array structure is capable of performing scan projection at different angles through conductive conditions of each of the wedge-shaped liquid crystal cells.

5. The wedge-shaped liquid crystal cell array capable of controlling light angle deflection as claimed in claim 3, wherein the reflective wedge-shaped liquid crystal cell is capable of using an electrically controlled switch to change a light reflection path and serving as a projection display device.

6. The wedge-shaped liquid crystal cell array capable of controlling light angle deflection as claimed in claim 2, wherein the array structure formed by the transmissive wedge-shaped liquid crystal cells combining side by side with one another is capable of using an electrically controlled switch to change a light penetration path, and applying in digital cameras and projectors to replace pixel shifting devices that require mechanical vibration.

7. The wedge-shaped liquid crystal cell array capable of controlling light angle deflection as claimed in claim 2, wherein the transmissive wedge-shaped liquid crystal cells are a two-dimensionally arranged array structure, and the extended slope of each of the wedge-shaped liquid crystal cells is disposed facing toward X-axis direction or Y-axis direction or XY-axis direction.

8. A wedge-shaped liquid crystal cell array capable of controlling light angle deflection, comprising:
a wedge-shaped upper cover glass, a bottom of the wedge-shaped upper cover glass being formed with an extended slope, an included angle ω being formed between the extended slope and a horizontal axis of a starting point of the extended slope, a plurality of first transparent conductive films being attached to the extended slope, the first transparent conductive films being disposed in a gradually lengthening manner, a transparent insulating layer being disposed between the adjacent first transparent conductive films, a first alignment film being attached to another side of the first transparent conductive film opposite to the extended slope, a refractive index of the wedge-shaped upper cover glass being $n_1$;
a liquid crystal layer, an upper side of the liquid crystal layer being attached to the first alignment film of the wedge-shaped upper cover glass, a refractive index of the liquid crystal layer being $n_2$; and
a base glass, the base glass and the wedge-shaped upper cover glass forming an accommodating space, the liquid crystal layer being disposed in the accommodating space, at least one second transparent conductive film being attached to a top side of the base glass, a second alignment film being attached to another side of the second transparent conductive film opposite to the base glass, another side of the second alignment film being attached to a bottom surface of the liquid crystal layer to form a transmissive wedge-shaped liquid crystal cell; wherein when the first transparent conductive film and the second transparent conductive film do not conduct electricity, $n_1 > n_2$, when the first transparent conductive film and the second transparent conductive film conduct electricity, $n_1 = n_2$, wherein an emergent light angle of the transmissive wedge-shaped liquid crystal cell is $\theta_{out}$ and an incident light angle of the transmissive wedge-shaped liquid crystal cell is $\theta_{in}$, a limiting condition for the included angle ω formed between the extended slope and the horizontal axis of the starting point of the extended slope is $$|\omega| < \sin^{-1}\left(\frac{1}{n_1}\right),$$

and the emergent light angle is determined according to the following formula: $\theta_{in} + \Delta n\omega$, two sets of the transmissive wedge-shaped liquid crystal cells are stacked, the base glass of the upper transmissive wedge-shaped liquid crystal cell is connected to the base glass of the lower transmissive wedge-shaped liquid crystal cell, a direction of the extended slope of the upper transmissive wedge-shaped liquid crystal cell is the same as a direction of the extended slope of the lower transmissive wedge-shaped liquid crystal cell to form a pixel displacement wedge-shaped liquid crystal cell module, and a light emission position of a transmitted light is controlled by conductive configurations of the first transparent conductive film and the second transparent conductive film of each of the transmissive wedge-shaped liquid crystal cells, a deflection amount of a light ray position of a transmitted light of the pixel displacement wedge-shaped liquid crystal cell module is determined according to the following formula:

$$d = h\omega\left(\frac{n_1}{n_2} - 1\right)(1 - \omega^2),$$

wherein the deflection amount of the light ray position is d, and a thickness of the liquid crystal layer is h.

9. The wedge-shaped liquid crystal cell array capable of controlling light angle deflection as claimed in claim 8, wherein two sets of the pixel displacement wedge-shaped liquid crystal cell modules are stacked, a direction of the extended slope of the upper pixel displacement wedge-shaped liquid crystal cell module is different from a direction of the extended slope of the lower pixel displacement wedge-shaped liquid crystal cell module, and a light emission position of a transmitted light is controlled by conductive configurations of the first transparent conductive film and the second transparent conductive film of each of the pixel displacement wedge-shaped liquid crystal cell modules.

10. A wedge-shaped liquid crystal cell array capable of controlling light angle deflection, comprising:
a wedge-shaped upper cover glass, a bottom of the wedge-shaped upper cover glass being formed with an extended slope, an included angle ω being formed between the extended slope and a horizontal axis of a starting point of the extended slope, a plurality of first transparent conductive films being attached to the extended slope, the first transparent conductive films being disposed in a gradually lengthening manner, a transparent insulating layer being disposed between the adjacent first transparent conductive films, a first alignment film being attached to another side of the first transparent conductive film opposite to the extended slope, a refractive index of the wedge-shaped upper cover glass being $n_1$;

a liquid crystal layer, an upper side of the liquid crystal layer being attached to the first alignment film of the wedge-shaped upper cover glass, a refractive index of the liquid crystal layer being $n_2$; and a base glass, the base glass and the wedge-shaped upper cover glass forming an accommodating space, the liquid crystal layer being disposed in the accommodating space, at least one second transparent conductive film being attached to a top side of the base glass, a second alignment film being attached to another side of the second transparent conductive film opposite to the base glass, another side of the second alignment film being attached to a bottom surface of the liquid crystal layer to form a transmissive wedge-shaped liquid crystal cell; wherein when the first transparent conductive film and the second transparent conductive film do not conduct electricity, $n_1 > n_2$, when the first transparent conductive film and the second transparent conductive film conduct electricity, $n_1 = n_2$, a reflective film is provided on a bottom side of the base glass to form a reflective wedge-shaped liquid crystal cell, wherein a reflected light angle of the reflective wedge-shaped liquid crystal cell is $\theta_{out}$ and an incident light angle of the reflective wedge-shaped liquid crystal cell is $\theta_{in}$, a limiting condition for the included angle $\omega$ formed between the extended slope and the horizontal axis of the starting point of the extended slope is $$|\omega| < \sin^{-1}\left(\frac{1}{n_1}\right),$$

and the reflected light angle is determined according to the following formula: $\theta_{out} = -2\Delta n\omega\theta_{in}$.

11. The wedge-shaped liquid crystal cell array capable of controlling light angle deflection as claimed in claim 10, wherein the transmissive wedge-shaped liquid crystal cell is stacked on the reflective wedge-shaped liquid crystal cell, a direction of the extended slope of the transmissive wedge-shaped liquid crystal cell is opposite to a direction of the extended slope of the reflective wedge-shaped liquid crystal cell, and a light emission direction of a reflected light is controlled by conductive configurations of the first transparent conductive films and the second transparent conductive films of the transmissive wedge-shaped liquid crystal cell and the reflective wedge-shaped liquid crystal cell.

12. The wedge-shaped liquid crystal cell array capable of controlling light angle deflection as claimed in claim 10, wherein the transmissive wedge-shaped liquid crystal cell is stacked on the reflective wedge-shaped liquid crystal cell, a direction of the extended slope of the transmissive wedge-shaped liquid crystal cell is the same as a direction of the extended slope of the reflective wedge-shaped liquid crystal cell, and a light emission direction of a reflected light is increased by conductive configurations of the first transparent conductive films and the second transparent conductive films of the transmissive wedge-shaped liquid crystal cell and the reflective wedge-shaped liquid crystal cell.

13. The wedge-shaped liquid crystal cell array capable of controlling light angle deflection as claimed in claim 12, further comprising an electrically controlled phase liquid crystal cell, the electrically controlled phase liquid crystal cell being disposed above the wedge-shaped upper cover glass, turn-on and turn-off of the electrically controlled phase liquid crystal cell controlling the entry of light of different phases and making a reflected light becoming a light with a same phase as the liquid crystal cell.

14. The wedge-shaped liquid crystal cell array capable of controlling light angle deflection as claimed in claim 10, wherein the transmissive wedge-shaped liquid crystal cell is stacked on the reflective wedge-shaped liquid crystal cell, alignment directions of the first alignment film and the second alignment film of the transmissive wedge-shaped liquid crystal cell and the first alignment film and the second alignment film of the reflective wedge-shaped liquid crystal cell are perpendicular to one another, so that an incident light enters from the transmissive wedge-shaped liquid crystal cell and penetrates to reach the reflective wedge-shaped liquid crystal cell, and becomes a reflected light with P-polarized light and S-polarized light with an angular shift.

15. The wedge-shaped liquid crystal cell array capable of controlling light angle deflection as claimed in claim 10, wherein two sets of the transmissive wedge-shaped liquid crystal cells stacked on each other are stacked on the reflective wedge-shaped liquid crystal cell, an included angle $\omega_B$ is formed between the extended slope of the reflective wedge-shaped liquid crystal cell and a horizontal axis of a starting point of the extended slope, an included angle $\omega_{G-B}$ is formed between the extended slope of the lower transmissive wedge-shaped liquid crystal cell and the horizontal axis of the starting point of the extended slope, an included angle $\omega_{R-B}$ is formed between the extended slope of the upper transmissive wedge-shaped liquid crystal cell and the horizontal axis of the starting point of the extended slope, when processing blue light angle compensation, the first transparent conductive film and the second transparent conductive film of the reflective wedge-shaped liquid crystal cell do not conduct electricity, the first transparent conductive films and the second transparent conductive films of the two sets of the transmissive wedge-shaped liquid crystal cells conduct electricity, when processing green light angle compensation, the first transparent conductive film and the second transparent conductive film of the reflective wedge-shaped liquid crystal cell do not conduct electricity, the first transparent conductive film and the second transparent conductive film of the lower transmissive wedge-shaped liquid crystal cell do not conduct electricity, the first transparent conductive film and the second transparent conductive film of the upper transmissive wedge-shaped liquid crystal cell conduct electricity, when processing red light angle compensation, the first transparent conductive film and the second transparent conductive film of the reflective wedge-shaped liquid crystal cell do not conduct electricity, the first transparent conductive film and the second transparent conductive film of the upper transmissive wedge-shaped liquid crystal cell do not conduct electricity, and the first transparent conductive film and the second transparent conductive film of the lower transmissive wedge-shaped liquid crystal cell conduct electricity.

16. The wedge-shaped liquid crystal cell array capable of controlling light angle deflection as claimed in claim 10, wherein the reflective wedge-shaped liquid crystal cells are combined side by side with one another to form an array structure.

17. The wedge-shaped liquid crystal cell array capable of controlling light angle deflection as claimed in claim 16, wherein the reflective wedge-shaped liquid crystal cells are a one-dimensionally arranged array structure, and the extended slope of each of the wedge-shaped liquid crystal cells is disposed facing toward X-axis direction or Y-axis direction.

18. The wedge-shaped liquid crystal cell array capable of controlling light angle deflection as claimed in claim 16, wherein the reflective wedge-shaped liquid crystal cells are a two-dimensionally arranged array structure, and the extended slope of each of the wedge-shaped liquid crystal cells is disposed facing toward X-axis direction or Y-axis direction or XY-axis direction.

19. The wedge-shaped liquid crystal cell array capable of controlling light angle deflection as claimed in claim 10, wherein the reflective wedge-shaped liquid crystal cell is capable of using an electrically controlled switch to correct a reflection angle to replace reflectors that require precise fine-tuning.

* * * * *